United States Patent
Kondo et al.

(10) Patent No.: US 7,668,319 B2
(45) Date of Patent: Feb. 23, 2010

(54) SIGNAL PROCESSING SYSTEM, SIGNAL PROCESSING APPARATUS AND METHOD, RECORDING MEDIUM, AND PROGRAM

(75) Inventors: Tetsujiro Kondo, Tokyo (JP); Masaaki Hattori, Chiba (JP); Tsutomu Watanabe, Kanagawa (JP); Hiroto Kimura, Tokyo (JP); Sakon Yamamoto, Tokyo (JP); Akihiko Arimitsu, Tokyo (JP)

(73) Assignee: Sony Corporation, Tokyo (JP)

( * ) Notice: Subject to any disclaimer, the term of this patent is extended or adjusted under 35 U.S.C. 154(b) by 1222 days.

(21) Appl. No.: 10/495,295

(22) PCT Filed: Aug. 27, 2003

(86) PCT No.: PCT/JP03/10824

§ 371 (c)(1),
(2), (4) Date: Nov. 26, 2004

(87) PCT Pub. No.: WO2004/025625

PCT Pub. Date: Mar. 25, 2004

(65) Prior Publication Data
US 2005/0073986 A1    Apr. 7, 2005

(30) Foreign Application Priority Data
Sep. 12, 2002    (JP)    ............................. 2002-266327

(51) Int. Cl.
*H03G 5/00*    (2006.01)
*H03G 3/00*    (2006.01)

(52) U.S. Cl. .......................................... 381/98; 381/61
(58) Field of Classification Search .................... 381/61, 381/98, 99, 94.1–94.8, 316, 320, 103; 700/94
See application file for complete search history.

(56) References Cited

U.S. PATENT DOCUMENTS 5,579,435 A * 11/1996 Jansson ....................... 704/233

(Continued)

FOREIGN PATENT DOCUMENTS

EP    0 732 687    9/1996

(Continued)

OTHER PUBLICATIONS

Yoshihisa Nakatoh et al., Generation of Broadband Speech from Narrowband Based on Linear Mapping, Nov. 25, 2000, vol. J83-D-II, No. 11, pp. 2246-2254.

(Continued)

*Primary Examiner*—Xu Mei
(74) *Attorney, Agent, or Firm*—Frommer Lawrence & Haug LLP; William S. Frommer; Thomas F. Presson

(57) ABSTRACT

The present invention relates to a signal processing system, a signal processing apparatus and method, a recording medium, and a program in which high frequency components of a narrow-range signal having suppressed high frequency components can be restored with high accuracy. A narrow-range audio signal having low frequency components is divided into frames by a frame-unit dividing unit 11, and is spectral-transformed into a signal on a frequency domain by a DCT transform unit 12. A learning-produced-data table 14 extracts, at an address corresponding to a class code supplied from a classifying unit 13, high-frequency-component DCT spectrum data. In a spectrum combining unit 16, the extracted high-frequency-component DCT spectrum data is combined with low-frequency-component DCT spectrum data output from the DCT transform unit 12. Subsequently, a broad-range audio signal having combined high frequency components and low frequency components is output. The present invention can be applied to cellular phones.

20 Claims, 36 Drawing Sheets

U.S. PATENT DOCUMENTS

| | | | | |
|---|---|---|---|---|
| 6,658,155 | B1 * | 12/2003 | Kondo et al. | 382/238 |
| 6,772,127 | B2 * | 8/2004 | Saunders et al. | 704/500 |
| 6,907,413 | B2 * | 6/2005 | Kondo et al. | 706/16 |
| 7,584,008 | B2 * | 9/2009 | Kondo et al. | 700/94 |
| 2005/0177257 | A1 * | 8/2005 | Kondo et al. | 700/94 |

FOREIGN PATENT DOCUMENTS

| | | |
|---|---|---|
| EP | 0 945 852 | 9/1999 |
| JP | 8 123484 | 5/1996 |
| JP | 8 278800 | 10/1996 |
| JP | 09 101798 | 4/1997 |
| JP | 2000 305599 | 11/2000 |
| WO | WO 02 13180 | 2/2002 |

OTHER PUBLICATIONS

Yuki Yoshida et al., Generation of Wideband Speech from Narrowband Speech by Codebook Mapping, Mar. 1995, D-II, vol. J78-D-II, No. 3, pp. 391-399.

Mitsuhiro Hosoki et al., Speech Signal Band Width Extension and Noise Removal Using Subband HMM, Proc IEEE ICASSP' 02, vol. 1, May 2002, pp. I-245-248.

Epps J et al: "A new technique for wideband enhancement of coded narrowband speech" Speech Coding Proceedings, 1999 IEEE Workshop on Porvoo, Finland, Jun. 20-23, 1999, Piscataway, NJ, USA, IEEE, US, Jun. 20, 1999, pp. 174-176, XP010345554 ISBN: 0-7803-5651-9.

* cited by examiner

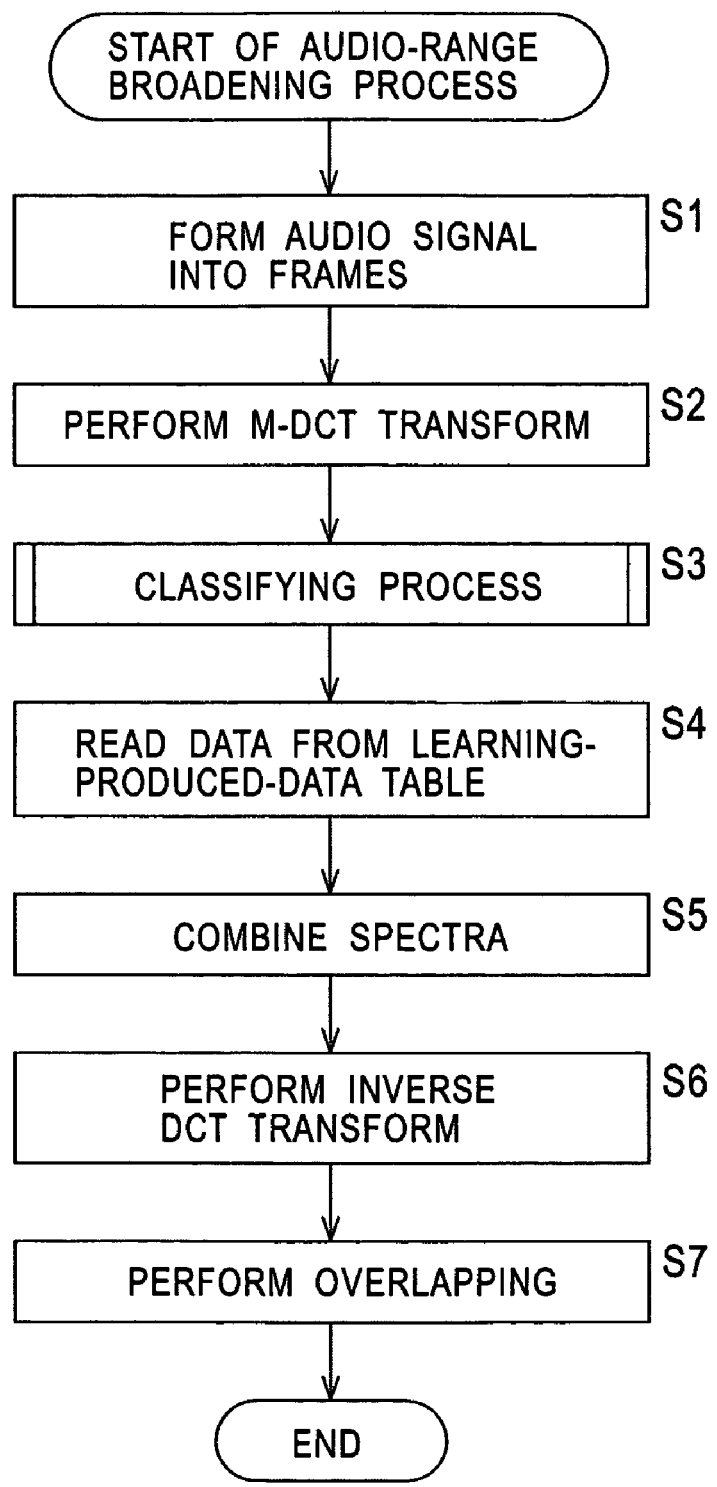

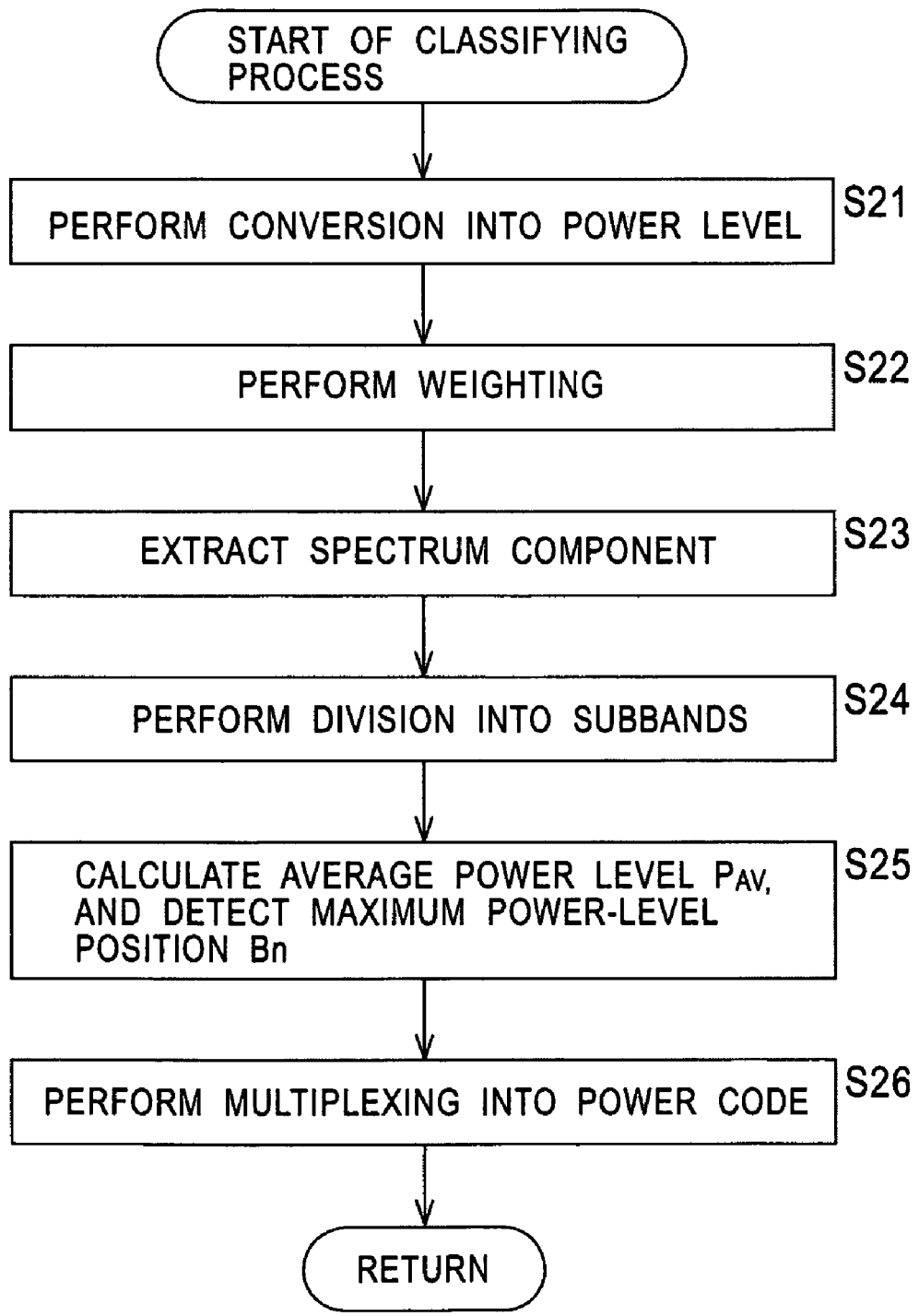

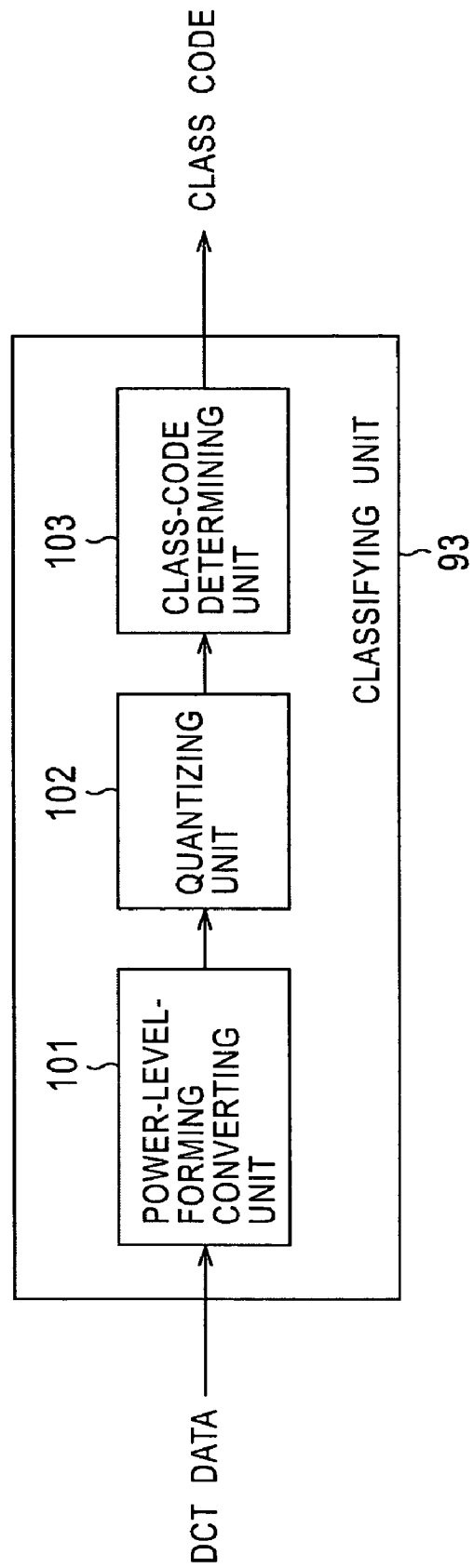

SIGNAL PROCESSING SYSTEM, SIGNAL PROCESSING APPARATUS AND METHOD, RECORDING MEDIUM, AND PROGRAM

TECHNICAL FIELD

The present invention relates to signal processing systems, signal processing apparatuses and methods, recording media, and programs, and in particular, to a signal processing system, a signal processing apparatus and method, a recording medium, and a program in which high frequency components of a narrow-range signal whose high frequency components are suppressed are restored with good accuracy.

BACKGROUND ART

Regarding technologies for expanding an audio signal having a narrow frequency band into a broadband, various propositions have been made to date.

For example, Japanese Unexamined Patent Application Publication No. 7-36490 (hereinafter referred to as Document 1) discloses a method in which, based on an input audio signal spectrum, lost harmonic components are generated by an arithmetic operation and are added.

Also, in a paper from Saitama University to the Acoustical Society of Japan, a method has been announced in which a phonic sound source waveform is generated by an autocorrelation arithmetic operation on an input signal and is used as high frequency components.

In addition, Japanese Unexamined Patent Application Publication No. 11-126097 and Japanese Unexamined Patent Application Publication No. 11-68515 (hereinafter referred to as Documents 3) discloses a sample-value interpolating method in the case of performing D/A conversion at a higher sampling frequency compared with an input signal.

Moreover, Japanese Unexamined Patent Application Publication No. 6-118995 (hereinafter referred to as Document 4) discloses a method that restores a broad-range audio signal by establishing correlation between a broad-range-audio-signal vector-quantization codebook and a narrow-range-audio-signal vector-quantization codebook.

The technology in Document 1 is such that, in a relatively-broad-range audio signal as in MP3 (Moving Picture Experts Group-1, Audio Layer-3) or the like, a high frequency signal which is lost in the process of compressing the audio signal is predicted and added, and its application is difficult, for example, when the bandwidth of an extremely-narrowed-range signal, such as a telephone audio range, is doubled.

Also, the technology in Document 2 is a process only on voiced sound and has a problem in that unvoiced sound (consonant portion) cannot be restored.

The technology in Documents 3 is such an extension of an interpolating filter that, in the case of sample value interpolating processing for increasing a sampling frequency, the level of the interpolating sample value is set to a value which is considered as appropriate after observing circumstances in which several adjacent samples change, and thus does not restore lost frequency components.

The technology in Document 4 is considered as assuming a vocal tract model as an input signal since an LPC (Liner Prediction Coefficient) analysis and synthesizing processing are used as a processing core. Accordingly, its application to musical sound is difficult.

DISCLOSURE OF INVENTION

The present invention is made in view of the above circumstances, and is intended to enable accurate restoration of high frequency components of a narrow-range signal having suppressed high frequency components.

In a signal processing system of the present invention, a first signal processing apparatus comprises: a first-signal input means for inputting a first signal having a broad range of frequency components; a second-signal input means for inputting a second signal in the first signal, the second signal having a narrow range having suppressed high frequency components; an extracting means for extracting high frequency components from the first signal input by the first-signal input means; a first determining means for determining each first class code based on the second signal input by the second-signal input means; and a storage means for storing, for the first class code determined by the first determining means, the high frequency components extracted by the extracting means; and a second signal processing apparatus comprises: a third-signal input means for inputting a third signal having a narrow range having suppressed high frequency components; a second determining means for determining a second class code based on the third signal input by the third-signal input means; a combining means for combining the high frequency components stored in the storage means, which correspond to the second class code determined by the second determining means, and the third signal input by the third-signal input means; and an output means for outputting the combined signal generated by the combining means.

In a signal processing method of the present invention for a signal processing system, a first signal processing apparatus includes: a first-signal input control step for controlling input of a first signal having a broad range of frequency components; a second-signal input control step for controlling input of a second signal in the first signal, the second signal having a narrow range having suppressed high frequency components; an extracting step for extracting high frequency components from the first signal whose input is controlled by processing in the first-signal input control step; a first determining step for determining each first class code based on the second signal whose input is controlled by processing in the second-signal input control step; and a storage step for storing, for the first class code, the high frequency components extracted by processing in the extracting step; and a second signal processing apparatus includes: a third-signal input control step for controlling input of a third signal having a narrow range having suppressed high frequency components; a second determining step for determining a second class code based on the third signal whose input is controlled by processing in the second-signal input control step; a combining step for combining the high frequency components stored by processing in the storage step, which correspond to the second class code determined by processing in the second determining step, and the third signal whose input is controlled by processing in the third-signal input control step; and an output control step for controlling output of the combined signal generated by processing in the combining step.

A first signal processing apparatus of the present invention comprises: first-signal input means for inputting a first signal having a broad range of frequency components; a second-signal input means for inputting a second signal in the first signal, the second signal having a narrow range having suppressed high frequency components; an extracting means for extracting high frequency components from the first signal input by the first-signal input means; a determining means for determining each class code based on the second signal input by the second-signal input means; and a storage means for storing, for the class code determined by the determining means, the high frequency components extracted by the extracting means.

A first signal processing method of the present invention includes: a first-signal input control step for controlling input of a first signal having a broad range of frequency components; a second-signal input control step for controlling input of a second signal in the first signal, the second signal having a narrow range having suppressed high frequency components; an extracting step for extracting high frequency components from the first signal whose input is controlled by processing in the first-signal input control step; a determining step for determining each class code based on the second signal whose input is controlled by processing in the second-signal input control step; and a storage step for storing, for the class code determined by processing in the determining step, the high frequency components extracted by processing in the extracting step.

A program on a first recording medium of the present invention includes: a first-signal input control step for controlling input of a first signal having a broad range of frequency components; a second-signal input control step for controlling input of a second signal in the first signal, the second signal having a narrow range having suppressed high frequency components; an extracting step for extracting high frequency components from the first signal whose input is controlled by processing in the first-signal input control step; a determining step for determining each class code based on the second signal whose input is controlled by processing in the second-signal input control step; and a storage step for storing, for the class code determined by processing in the determining step, the high frequency components extracted by processing in the extracting step.

A first program of the present invention allows a computer to execute: a first-signal input control step for controlling input of a first signal having a broad range of frequency components; a second-signal input control step for controlling input of a second signal in the first signal, the second signal having a narrow range having suppressed high frequency components; an extracting step for extracting high frequency components from the first signal whose input is controlled by processing in the first-signal input control step; a determining step for determining each class code based on the second signal whose input is controlled by processing in the second-signal input control step; and a storage step for storing, for the class code determined by processing in the determining step, the high frequency components extracted by processing in the extracting step.

An audio signal may be input to the input means in the first signal processing apparatus of the present invention.

When the signal input to the first signal processing apparatus of the present invention is an audio signal, based on the second signal, which is processed by weighting based on equal loudness characteristics, the determining means may determine the class code.

When the signal input to the first signal processing apparatus of the present invention is an audio signal, based on the positions of the average power level and maximum power level of an audio signal spectrum, the determining means may determine the class code.

When the signal input to the first signal processing apparatus of the present invention is an audio signal, the determining means may determine the class code of a spectral component equal to or greater than a frequency which is ½ times or ⅓ times the lowest frequency of the high frequency components extracted by the extracting means.

An image signal may be input to the input means in the first signal processing apparatus of the present invention.

When the signal input to the first signal processing apparatus of the present invention is an image signal, based on the alternating-current average-power level, direct-current power level, and alternating-current-component peak-power level of the spectrum of the image signal, the determining means may determine the class code.

In the storage means in the first signal processing apparatus of the present invention, the high frequency components extracted by the extracting means may be stored so as to be correlated to specific information.

The specific information in the first signal processing apparatus of the present invention may be the telephone number of a telephone set.

A generating means for generating the second signal by decimating the first signal in the first signal processing apparatus of the present invention at predetermined time intervals may be further provided.

A second signal processing apparatus of the present invention comprises: a signal input means for inputting a signal having a narrow range having suppressed high frequency components; a determining means for determining a class code based on the signal input by the signal input means; a storage means for storing high frequency components; a combining means for combining high frequency components stored in the storage means, which correspond to the class code determined by the determining means, and the signal input by the signal input means; and an output means for outputting the combined signal generated by the combining means.

A second signal processing method of the present invention includes: a signal-input control step for controlling input of a signal having a narrow range having suppressed high frequency components; a determining step for determining a class code based on the signal whose input is controlled by processing in the signal-input control step; a storage control step for controlling storage of high frequency components; a combining step for combining the high frequency components whose storage is controlled by processing in the storage control step, which correspond to the class code determined by processing in the determining step, and the signal input by processing in the signal-input control step; and an output control step for controlling output of the combined signal generated by processing in the combining step.

A program on a second recording medium of the present invention includes: a signal-input control step for controlling input of a signal having a narrow range having suppressed high frequency components; a determining step for determining a class code based on the signal whose input is controlled by processing in the signal-input control step; a storage control step for controlling storage of high frequency components; a combining step for combining the high frequency components whose storage is controlled by processing in the storage control step, which correspond to the class code determined by processing in the determining step, and the signal input by processing in the signal-input control step; and an output control step for controlling output of the combined signal generated by processing in the combining step.

A second program of the present invention allows a computer to execute: a signal-input control step for controlling input of a signal having a narrow range having suppressed high frequency components; a determining step for determining a class code based on the signal whose input is controlled by processing in the signal-input control step; a storage control step for controlling storage of high frequency components; a combining step for combining the high frequency components whose storage is controlled by processing in the storage control step, which correspond to the class code determined by processing in the determining step, and the signal input by processing in the signal-input control step; and an output control step for controlling output of the combined signal generated by processing in the combining step.

An audio signal may be input to the input means in the second signal processing apparatus of the present invention.

When the signal input to the second signal processing apparatus of the present invention is an audio signal, based on the second signal, which is processed by weighting based on equal loudness characteristics, the determining means may determine the class code.

When the signal input to the second signal processing apparatus of the present invention is an audio signal, based on the positions of the average power level and maximum power level of an audio signal spectrum, the determining means may determine the class code.

When the signal input to the second signal processing apparatus of the present invention is an audio signal, the determining means may determine the class code of a spectral component equal to or greater than a frequency which is ½ times or ⅓ times the lowest frequency of the high frequency components extracted by the extracting means.

An image signal may be input to the input means in the second signal processing apparatus of the present invention.

When the signal input to the second signal processing apparatus of the present invention is an image signal, based on the alternating-current average-power level, direct-current power level, and alternating-current-component peak-power level of the spectrum of the image signal, the determining means may determine the class code.

The high frequency components stored in the storage means in the second signal processing apparatus of the present invention may be updated with predetermined timing.

In the storage means in the second signal processing apparatus of the present invention, the high frequency components extracted by the extracting means may be stored so as to be correlated to specific information.

The specific information in the second signal processing apparatus of the present invention may be the telephone number of a telephone set.

In a signal processing system and signal processing method of the present invention, a first signal processing apparatus extracts high frequency components from a broad range of frequency components, determines a first class code based on a second signal in the first signal which has suppressed high frequency components, and stores the high frequency components for each class code. In the second signal processing apparatus, based on a third signal having a narrow range having suppressed high frequency components, a second class code is determined, and a third signal is generated by combination with the high frequency components which correspond to the second class code.

In a first signal processing apparatus and method, recording medium, and program, high frequency components are extracted from a first signal having a broad range of high frequency components, and based on a second signal in the first signal which has a narrow range having suppressed high frequency components, each class code is determined. The high frequency components are stored for the class code.

In a second signal processing apparatus and method, recording medium, and program, based on a signal having a narrow range having high frequency components, a class code is determined, the high frequency components, which correspond to the class code, and the signal having a narrow range are combined, whereby the combined signal is generated and output.

The signal processing apparatus may be a separate apparatus or may be a block that performs signal processing for an apparatus.

BRIEF DESCRIPTION OF THE DRAWINGS

FIG. 3 is a flowchart illustrating an audio-range-broadening process in the audio-signal broadening apparatus in FIG. 1.

FIG. 6 is a flowchart illustrating the classifying process in the step S3 in FIG. 3.

FIG. 15 is a block diagram showing an example of the classifying unit in FIG. 14.

BEST MODE FOR CARRYING OUT THE INVENTION

Figure 1:
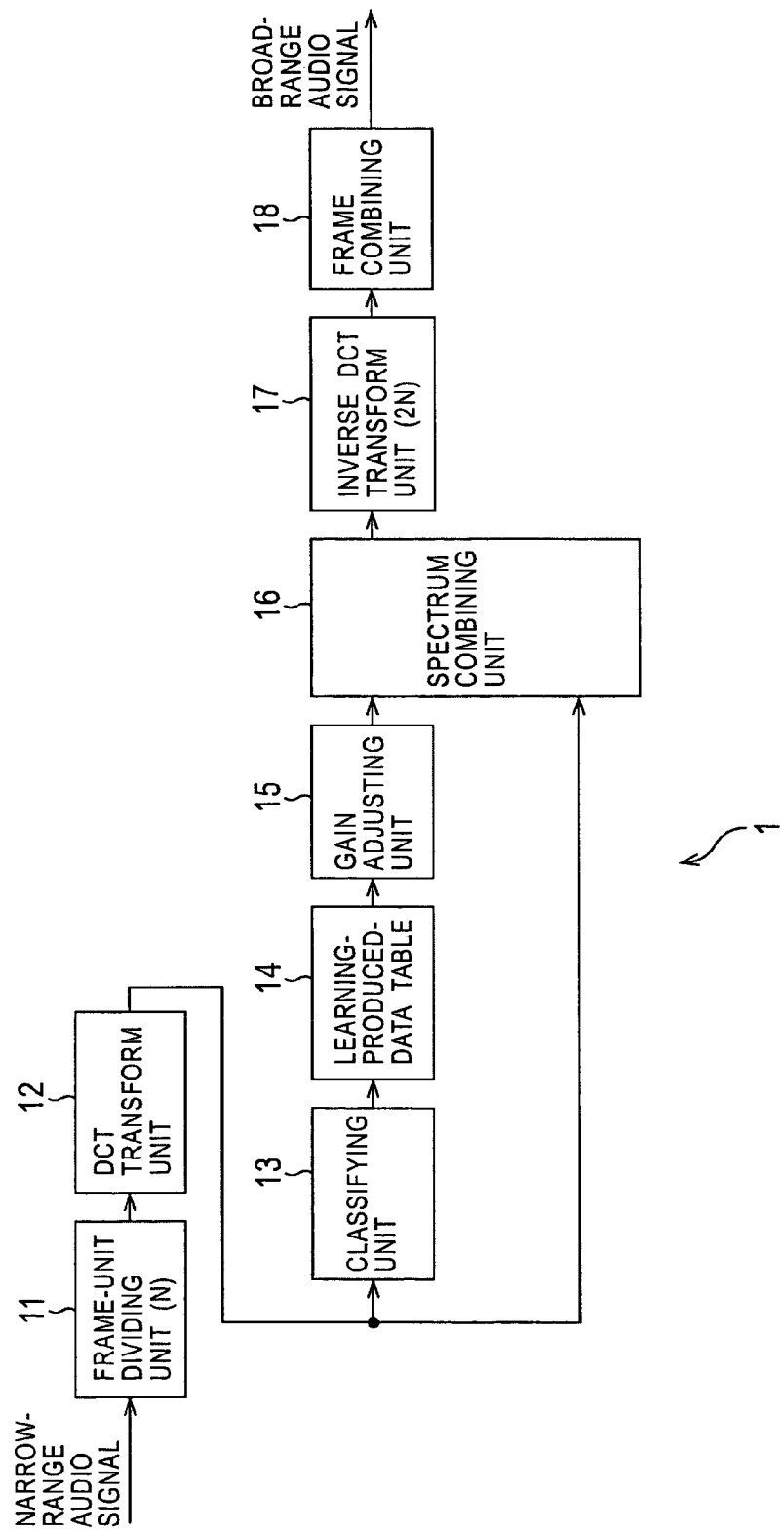
FIG. 1 is a block diagram showing an example of an audio-signal broadening apparatus according to a first embodiment of the present invention.

FIG. 1 shows an example of an audio-signal broadening apparatus according to a first embodiment of the present invention.

A narrow-range audio signal having low frequency components (not having high frequency components) is input to a frame-unit dividing unit 11. The input audio signal is divided by a predetermined frame (unit time) into blocks, and is output to a DCT (Discrete Cosine Transform) converting unit 12.

The DCT converting unit 12 performs, for each frame, a spectrum transform on the input audio signal, which is in time domain and is input from the frame-unit dividing unit 11, into a signal in frequency domain, and outputs the transformed signal to a classifying unit 13 and to a spectrum combining unit 16. As a method for performing the spectrum transform, an M-DCT (modified DCT) which allows adjacent blocks to half overlap each other is here used.

Spectrum transforms other the above M-DCT transform include DFT (Discrete Fourier Transform), DCT (Discrete Cosine Transform), FFT (Fast Fourier Transform), or methods such as LPC. They may include whatever transforms an audio signal in time domain into a signal in frequency domain.

The classifying unit 13 calculates a class code by using a classifying process (its details are described later with reference to FIG. 6) based on the input spectrum signal, and outputs the class code to a learning-produced-data table 14.

Figure 10:
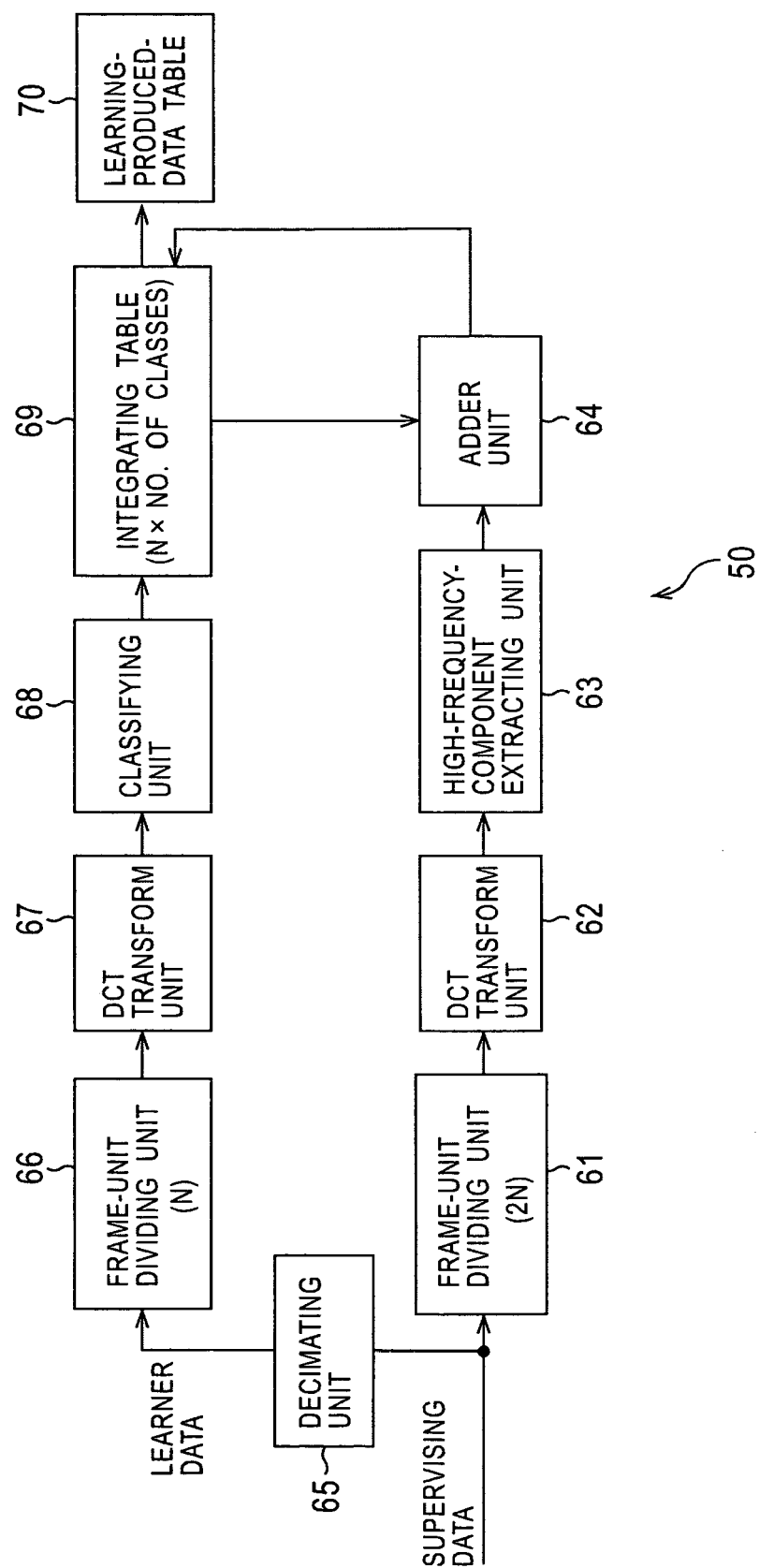
FIG. 10 is a block diagram showing an example of an audio-signal learning apparatus.

The learning-produced-data table 14 is a table memory in which class codes are used as addresses, and vector data items of an audio signal spectrum of high frequency components found by a learning apparatus, which is described later using FIG. 10, are stored at class code addresses. The learning-produced-data table 14 reads vector data of a high-frequency-component audio signal spectrum which corresponds to the class code input from the classifying unit 13, and outputs the read data to a gain adjusting unit 15.

The gain adjusting unit 15 adjusts the gain of the high-frequency-component audio-signal-spectrum data input from the learning-produced-data table 14 to match the gain of low-frequency-component audio-signal-spectrum data to be combined by a spectrum combining unit 16.

The spectrum combining unit 16 combines the high-frequency-component audio-signal-spectrum vector data input from the gain adjusting unit 15 with the last or subsequent row of the low-frequency-component audio-signal-spectrum vector data input from the DCT transform unit 12, and outputs the combined data to an inverse DCT transform unit 17.

The inverse DCT transform unit 17 transforms spectrum data in frequency domain into a spectrum in time domain by performing the inverse of the M-DCT transform, and outputs the spectrum to a frame combining unit 18.

The frame combining unit 18 performs a process of adding overlapping frame portions for preventing sound from discontinuing in frame boundaries before outputting an audio signal.

Figure 2:
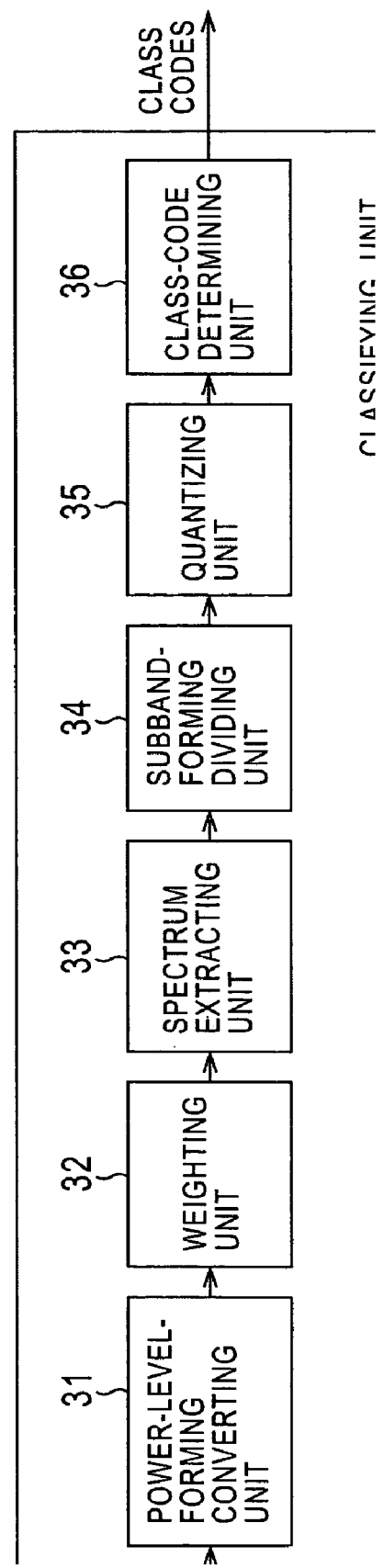
FIG. 2 is a block diagram showing an example of the classifying unit in FIG. 1.

FIG. 2 shows a detailed example of the classifying unit 13 in FIG. 1.

The DCT spectrum data M-DCT-transformed, output by the DCT transform unit 12, is input to a power-level converting unit 31. The input DCT spectrum data is converted into a power level, and is converted into a dB (decibel) value before being output to a weighting unit 32.

Figure 7:
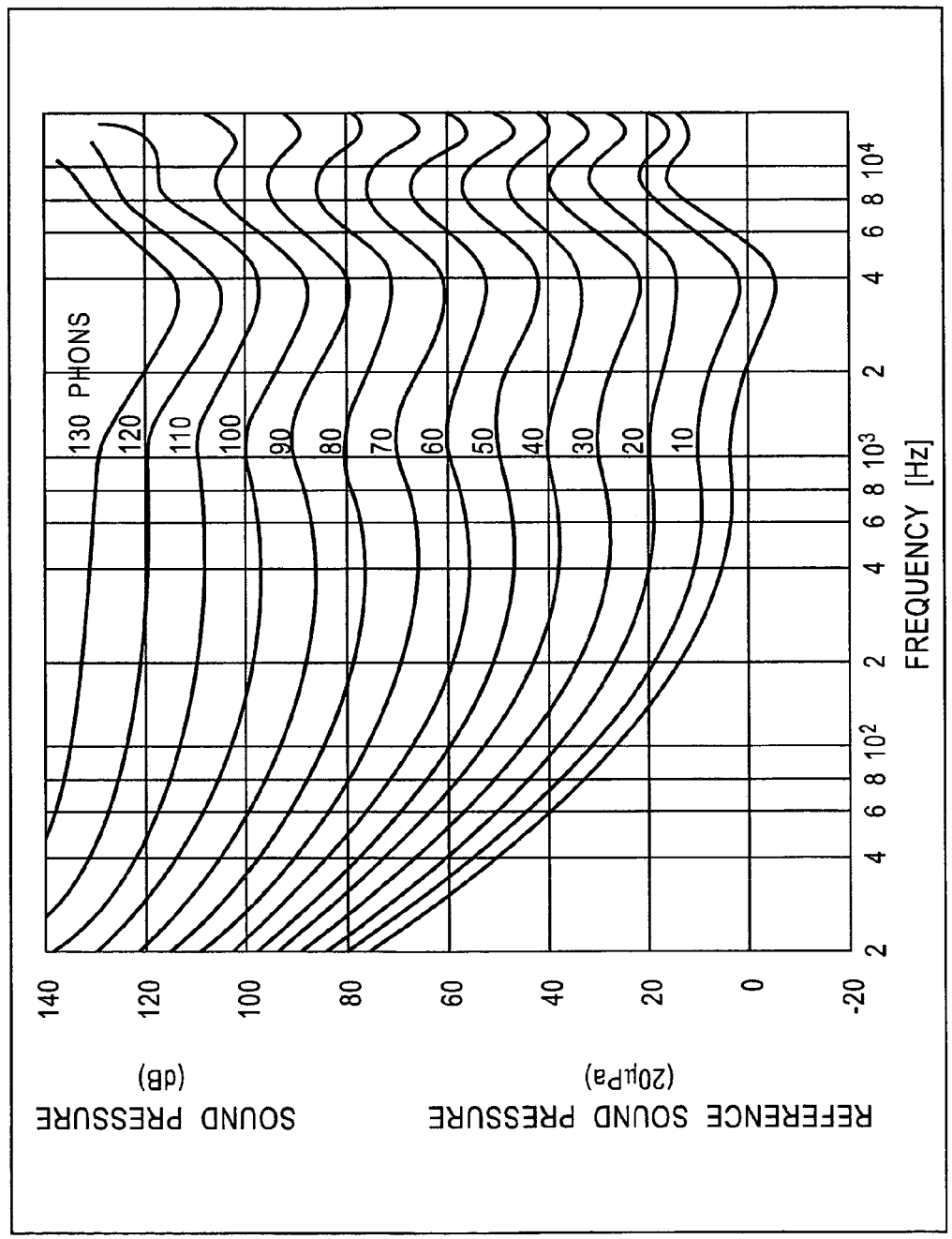
FIG. 7 is a graph illustrating equal loudness curves of sounds.

The weighting unit 32 performs, on the input DCT spectrum data, a weighting process in which an equal loudness characteristic, which is described later with reference to FIG. 7, is considered, and outputs the processed data to a spectrum extracting unit 33.

The spectrum extracting unit 33 extracts, from the input DCT spectrum data of low frequency components, DCT spectrum data equal to or less than a frequency which is ½ or ⅓ times the lowest frequency of a high frequency component to be restored, and outputs the extracted data to a subband-forming dividing unit 34.

The subband-forming dividing unit 34 divides the DCT spectrum data extracted by the spectrum extracting unit 33 into a predetermined number of subbands, and outputs the subbands to a quantizing unit 35.

The quantizing unit 35 arranges the DCT spectrum data divided into subbands, in units of subbands, finds the average of power levels in the input portion (extracted by the spectrum extracting unit 33), and uses quantization on the average to generate a class code. It also finds a subband position corresponding to the maximum power level and generates a class code based on it. Two class codes are output to a class-code determining unit 36.

The class-code determining unit 36 generates a single class code by multiplexing the class code based on the average of power levels which is input from the quantizing unit 35 and the class code based on the maximum power position, and outputs the generated class code to a learning-produced-data table 14 (FIG. 1).

Figure 4A:
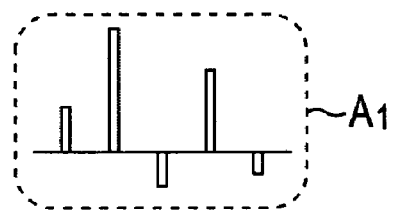
FIG. 4A is an illustration of an example of data in the audio-range-broadening process.
Figure 4B:
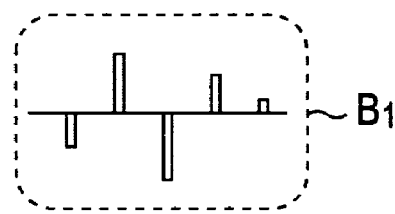
FIG. 4B is an illustration of an example of data in the audio-range-broadening process.
Figure 4C:
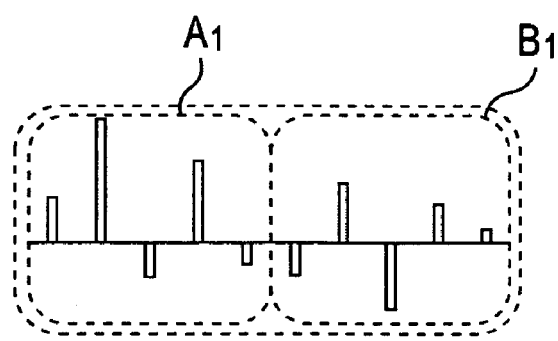
FIG. 4C is an illustration of an example of data in the audio-range-broadening process.

Next, an audio-range broadening process of the audio-signal broadening apparatus 1 is described with reference to the flowchart in FIG. 3 and to FIGS. 4A to 4C.

In step S1, the frame-unit dividing unit 11 divides, into frames, the audio signal input to the audio-range broadening process of the audio-signal broadening apparatus 1, which has suppressed high frequency components. Specifically, the audio signal is divided into blocks for each predetermined frame (unit time).

In step S2, the DCT transform unit 12 performs an M-DCT transform on the audio signal divided into frames in step S1. FIG. 4A shows data (hereinafter referred to as DCT spectrum data) obtained by the M-DCT transform of the audio signal in one frame.

In step S3, the classifying unit 13 calculates a class code by performing a classifying process, which is described later with reference to FIG. 6.

In step S4, the learning-produced-data table 14 reads DCT vector data of a high frequency component which is stored at an address corresponding to the class code output in step S3 from the classifying unit 13. FIG. 4B shows the high-frequency-component spectrum data read as described above.

In step S5, the spectrum combining unit 16 combines the low-frequency-component DCT spectrum data (the portion denoted by spectrum $A_1$ in FIG. 4A) input to the audio-range broadening process of the audio-signal broadening apparatus 1 and the high-frequency-component spectrum data (the portion denoted by spectrum $B_1$ in FIG. 4B) read from the learning-produced-data table 14. In other words, as FIG. 4C shows, the leading end (lower frequency side) of the spectrum $B_1$ is connected to the rear end (higher frequency side) of the spectrum $A_1$. The number of items of the data output by the DCT transform unit 12 is N, and also the number of items of the data read from the learning-produced-data table 14 is N. Thus, the number of the combined data items is 2N.

In step S6, the inverse DCT transform unit 17 performs an inverse M-DCT transform on the DCT spectrum data combined in spectrum.

In step S7, the frame combining unit 18 performs overlapping addition on a frame boundary, and outputs the obtained result before ending the audio-range broadening process. This overlapping prevents the audio from being discontinuous also in the frame boundary.

Next, the classifying process in FIG. 3 is described.

Figure 5A:
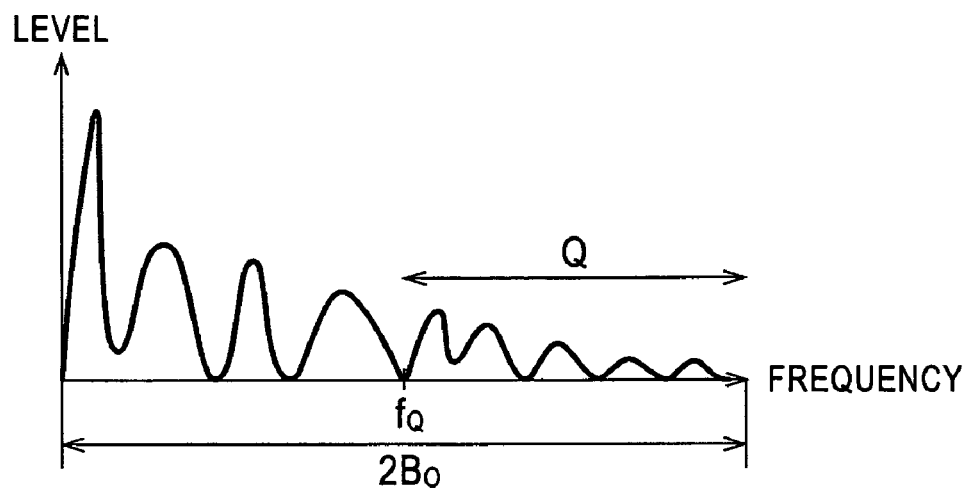
FIG. 5A is a graph illustrating the fundamental principle of a classifying process.
Figure 5B:
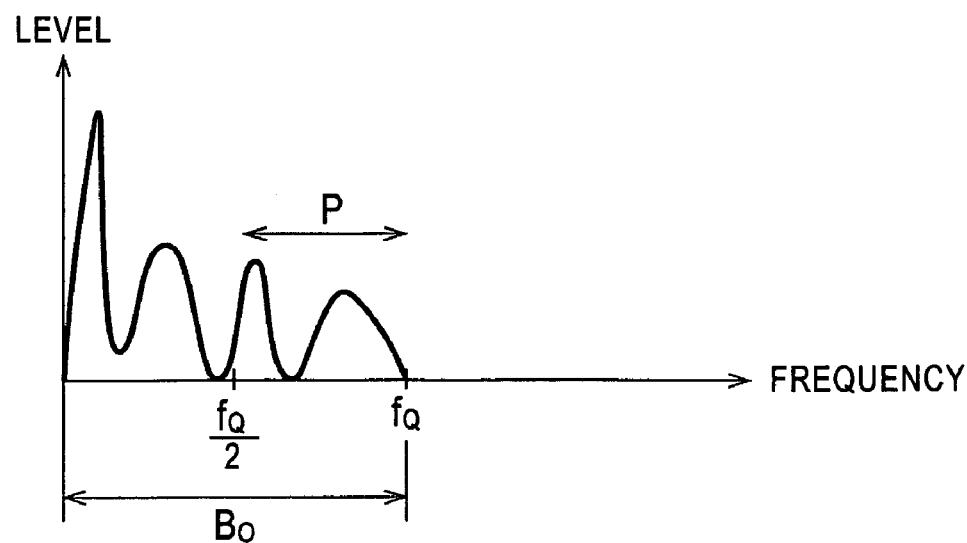
FIG. 5B is a graph illustrating the fundamental principle of a classifying process.

At first, the fundamental principle of the classifying process is described with reference to FIGS. 5A and 5B. FIG. 5A shows a supervising DCT spectrum having low frequency components and high frequency components which have a bandwidth $2B_0$, and FIG. 5B shows a learner DCT spectrum only having narrow low frequency components having a bandwidth $B_0$.

The classifying process is performed based on the assumption that there is a linking relationship between the amount of high frequency components included in a narrow-range signal and frequency components whose spectrum form is to be restored. In other words, in the case of assuming a model in which an audio signal is composed of a pitch frequency and its harmonic components, it is expected that a signal corresponding to a harmonic component which is two or three times the higher range region P which is approximately a half of the bandwidth $B_0$ in FIG. 5B is included in the higher range region Q which is approximately a half of the bandwidth $2B_0$ in FIG. 5A. Conversely, when the region P has almost no spectrum, it is expected that there is a low possibility that also the region Q has a signal.

Next, the classifying process is described with reference to FIG. 6.

In step S21, the power-level-forming converting unit 31 converts the spectrum data input from the DCT transform unit 12 into a power level, and further converts the level into a dB (decibel) value. In other words, the input spectrum data x[k] (k=0, 1, . . . , N−1) is converted into the average power level PWR by the following expression:

$$PWR = |x[k]|^2 = \frac{1}{N}\sum_{i=0}^{N-1} x[i]^2$$

In addition, the power level PWR is converted into the dB value $PWR_{dB}$ by the following expression:

$PWR_{dB} = 10 \log_{10}(PWR)$

In step S22, in the weighting unit 32, weighting into which human ear characteristics are considered is performed on the power decibel value $PWR_{dB}$ calculated in step S23.

A relationship between sound magnitude that a human can subjectively feel and a sound pressure level can be indicated by equal loudness curves as shown in FIG. 7. This indicates a relationship between the sound pressure level and frequency of pure sound that a person having a normal acoustic sense feels as an equal magnitude. As the curves indicate, ears of us, humans, have low sensitivity in low frequencies and high frequencies.

Figure 8:
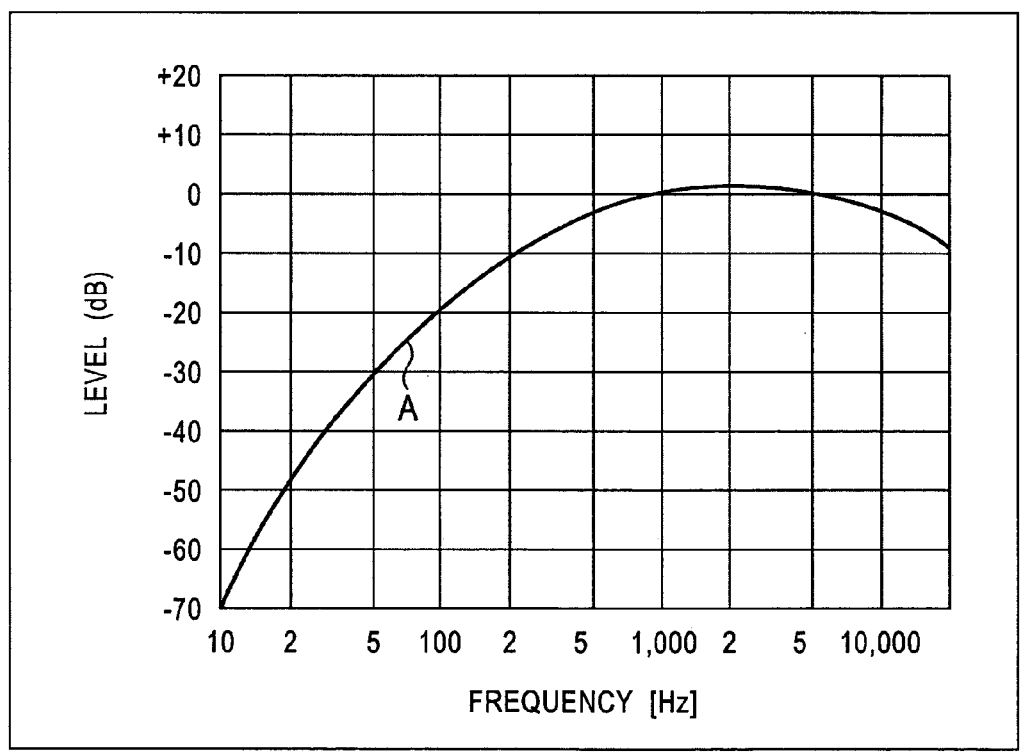
FIG. 8 is a graph showing an A-characteristic curve which frequency-corrects sound.

Such a process that frequency correction based on human ear characteristics is performed is the weighting performed in step S22. Specifically, correction which is called A-characteristic curve denoted by symbol A in FIG. 8 is performed on the input signal.

After the weighting is performed in step S22, in step S23, the spectrum extracting unit 33 extracts, from the input low-frequency-component spectrum data, spectrum data equal to or less than a frequency which is ½ or ⅓ times the lowest frequency of a high frequency component to be restored, and outputs the extracted data to the subband-forming dividing unit 34. This is performed based on the above-described fundamental principle of the classifying process.

In other words, the lowest frequency in the region Q in FIG. 5, as a higher frequency component to be restored, is $f_Q$. From the spectrum data in FIG. 5B, as a lower frequency component, a spectrum in the region P which is, for example, not less than frequency $f_Q/2$ that is a half of the frequency $f_Q$, is extracted.

In step S24, the subband-forming dividing unit 34 divides the spectrum data (the spectrum data from the frequency $f_Q/2$ in FIG. 5B to the frequency $f_Q$) extracted in step S23 into a predetermined number, for example, 32 subbands, and arranges the spectrum data in units of subbands.

Figure 9:
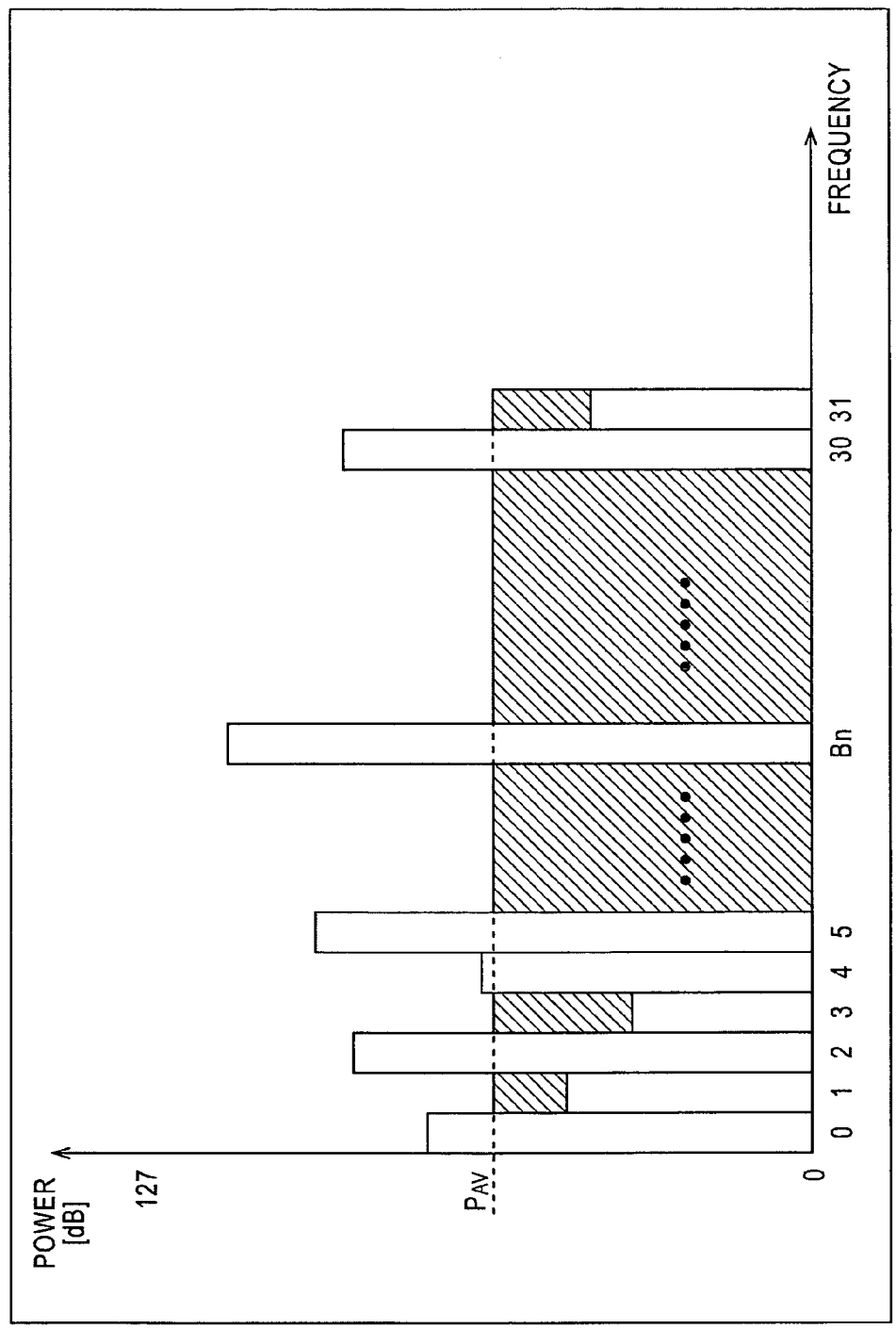
FIG. 9 is a graph illustrating processing in the step S25 in FIG. 6.

In step S25, as shown in FIG. 9, among the average power level $P_{AV}$ of the 32 overall subbands and the 32 subbands, a subband position $B_n$ in which the decibel power value $PWR_{dB}$ is the maximum is found. The range of the spectrum decibel power levels is, for example, 0 to 127 [dB].

In step S26, the class-code determining unit 36 multiplexes a class code based on the average power level $P_{AV}$ output in step S25 and a class code based on the maximum power position $B_n$. In the example in FIG. 9, the class code based on the maximum power position $B_n$ can have 32 values from 0 to 31, and the class code based on the average power level $P_{AV}$ can have 128 values from 0 to 127. Therefore, the number of the combined class codes is 32×128=4096. Any one of the 4096 values is output as the class code.

Methods for modeling the spectrum form can include, in addition to the above, a method that detects a plurality of spectrum peaks, a method that detects a spectrum inclination and power distribution, and a method that changes the number of subbands.

Next, a learning apparatus that generates vector data items of high frequency components stored for class codes, which are to be written in the learning-produced-data table 14 in the audio-signal broadening apparatus 1, is described with reference to FIG. 10. This learning apparatus 50 is retained by, for example, a manufacture for producing the audio-signal broadening apparatus 1.

Initially, a broad-range audio signal which is used as a supervising signal and which includes high frequency components and a narrow-range audio signal as a learner signal in which the high frequency components of the supervising data are suppressed are prepared. In the example in FIG. 10, the learner data is generated such that the low frequency components generated by eliminating the high frequency components of the supervising data are reduced to half by sample decimation in a decimating circuit 65.

Accordingly, let the frame length of the learner data input to a frame-unit dividing unit 66 be N, the frame length of the supervising data input to a frame-unit dividing unit 61 is 2N. Also, data in each frame at this time is synchronized.

The functions of the frame-unit dividing unit 61, the frame-unit dividing unit 66, a DCT transform unit 62, and a DCT transform unit 67 are similar to those of the frame-unit dividing unit 11 and the DCT transform unit 12 in FIG. 1.

A high-frequency-component extracting unit 63 extracts the higher half of the supervising data spectrum and outputs the extracted half to an adder unit 64.

A classifying unit 68 generates class codes similar to those described above in the classifying unit 13 in FIG. 1, and calculates and outputs a class-occurrence frequency to an integrating table 69.

The integrating table 69 receives, as input addresses, the class codes output by the classifying unit 68, and reads and outputs DCT vector data items-stored at the addresses to the adder unit 64. The adder unit 64 performs vector addition on N high-frequency-component DCT-vector-data items output from the high-frequency-component extracting unit 63 and N DCT-vector-data items output from the integrating table 69, and outputs the results to the positions of the addresses of the class codes identical to those used when the integrating table 69 outputs data. Because N DCT-vector-data items are stored at one class code address, the integrating table 69 is a table containing (N×the number of classes) data items. Also, with predetermined timing, the integrating table 69 divides the vector data items stored at their class code addresses by the class-occurrence frequency output from the encoding parameter encoder classifying unit 68, and outputs the results to a learning-produced-data table 70.

The learning-produced-data table 70 stores the (N×the number of classes) DCT-vector-data items output from the integrating table 69. The data items in the learning-produced-data table 70 are transferred to the audio-signal broadening apparatus 1 by a network and is stored in the learning-produced-data table 14. Alternatively, the data items in the learning-produced-data table 70 are written in a semiconductor memory or the like, and are set up as the learning-produced-data table 14 of the audio-signal broadening apparatus 1.

Since the structure of the classifying unit 68 in the learning apparatus 50 is similar to that of the classifying unit 13 in the audio-signal broadening apparatus 1, the structure of the classifying unit 13 in FIG. 2 is referred to as that of the classifying unit 68 in FIG. 10, if needed.

Next, the learning process of the learning apparatus 50 is described with reference to the flowchart in FIG. 11.

In step S51, the spectrum of the supervising data and the spectrum of the learner data are formed into frames. In other words, the frame-unit dividing unit 61 divides the input supervising data in each unit time into frames, and extracts 2N samples per frame. The decimating circuit 65 generates learner data by extracting only the low frequency components from the supervising data and alternately decimates the low frequency components. The frame-unit dividing unit 66 divides the learner data in each unit time into frames and extracts N samples per frame.

Figure 12A:
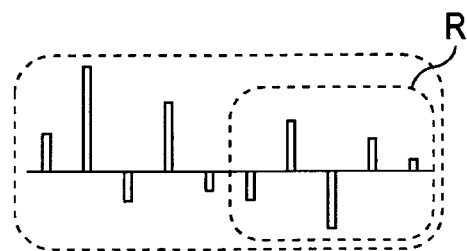
FIG. 12A is a graph showing an example of audio signal data in the learning process.
Figure 12B:
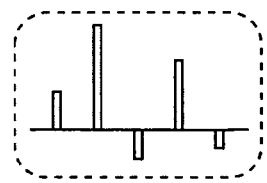
FIG. 12B is a graph showing an example of audio signal data in the learning process.

In step S52, the DCT transform unit 62 and the DCT transform unit 67 performs M-DCT transforms on the supervising data and the learner data, respectively. FIG. 12A shows DCT spectrum data obtained after the supervising data is M-DCT-transformed, and FIG. 12B shows DCT spectrum data obtained after the learner data is M-DCT-transformed. As is clear from comparison between both, the DCT spectrum of the learner data in FIG. 12B corresponds to the low frequency components of the M-DCT spectrum of the supervising data in FIG. 12A.

Figure 13:
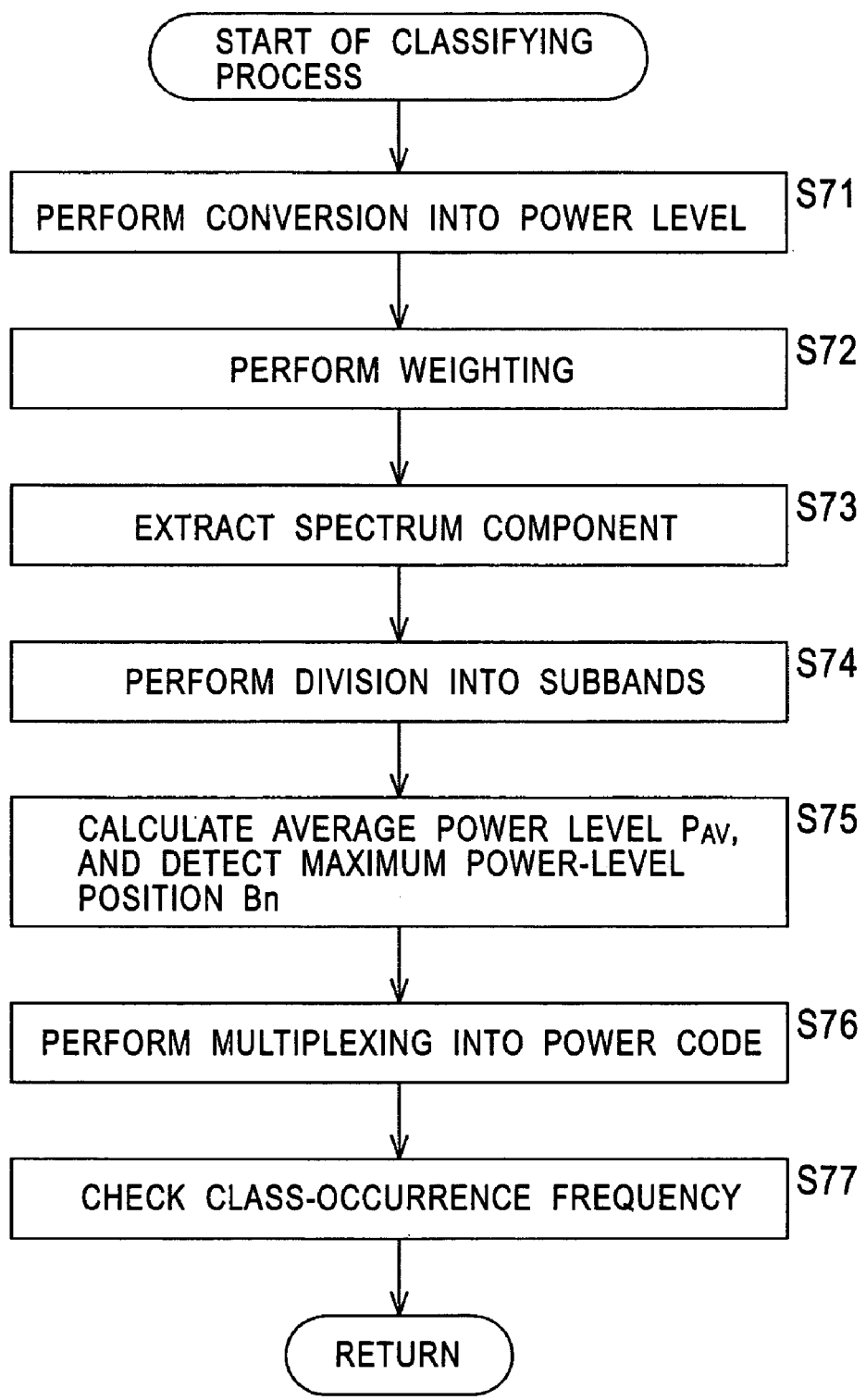
FIG. 13 is a flowchart illustrating the classifying process in the step S53 in FIG. 11.

In step s53, by performing a classifying process, which is described later with reference to FIG. 13, based on the learner data spectrum, the classifying unit 68 calculates class codes and a class-occurrence frequency and outputs the calculated results to the integrating table 69.

In step S54, the integrating table 69 reads vector data items stored at addresses corresponding to the class codes output by the classifying unit 68.

Figure 12C:
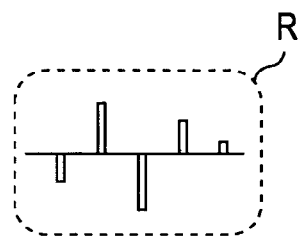
FIG. 12C is a graph showing an example of audio signal data in the learning process.

In step S55, the high-frequency-component extracting unit 63 extracts high frequency components from the supervising data input from the DCT transform unit 62. FIG. 12C shows the DCT spectrum of the extracted high frequency components. This corresponds to a higher portion R in the entire DCT spectrum of the supervising data in FIG. 12A.

Figure 12D:
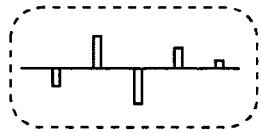
FIG. 12D is a graph showing an example of audio signal data in the learning process.
Figure 12E:
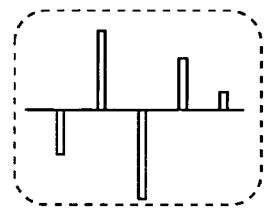
FIG. 12E is a graph showing an example of audio signal data in the learning process.

In step S56, the adder unit 64 performs vector addition on the vector data (the data shown in FIG. 12D) read for the integrating table 69 in step S54 and the vector data (the data shown in FIG. 12C) of the high frequency components extracted from the supervising data in step S55. FIG. 12E shows DCT spectrum data obtained after the vector addition is performed in step S56.

In step S57, the adder unit 64 stores the vector data (the data shown in FIG. 12E) calculated in step S56 at the position of the class code address identical to that used when the integrating table 69 is read.

In step S58, it is determined whether the learning process has ended. When it is determined that the learning process has not ended yet, the process returns to step S51 and the subsequent steps are repeated. When it is determined that the learning process has ended, the process proceeds to step S59.

Figure 12F:
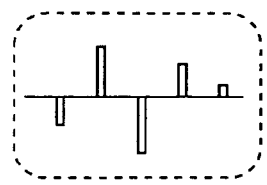
FIG. 12F is a graph showing an example of audio signal data in the learning process.

When it is determined in step S58 that the learning process has ended, in step S59, the integrating table 69 calculates the average of vector data items by dividing N items of the vector data stored at their class code addresses by the class-occurrence frequency of the corresponding class code, and outputs and stores the average in the learning-produced-data table 70 before ending the learning process. FIG. 12F shows N vector data items stored at the address of one class code.

Figure 11:
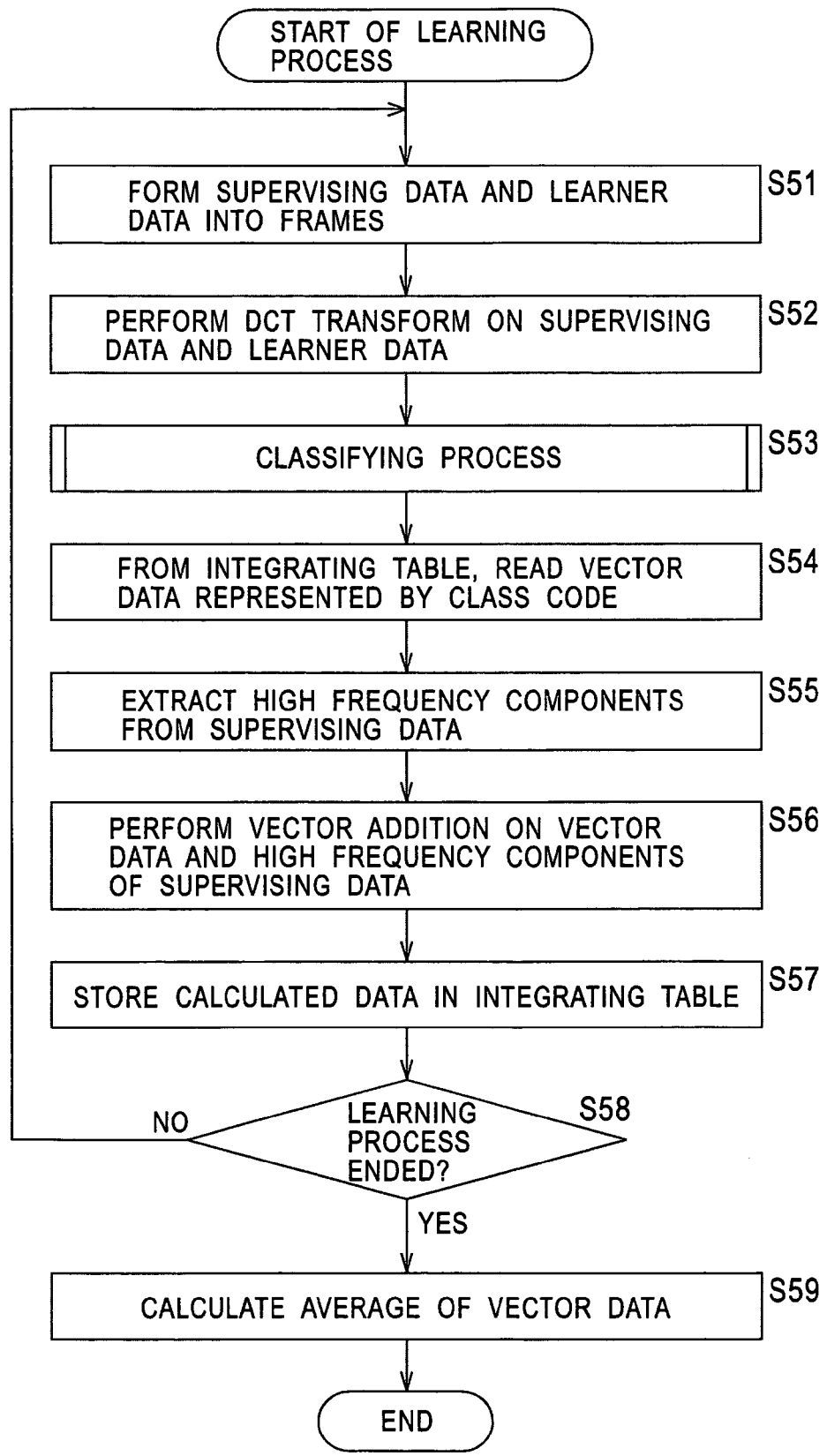
FIG. 11 is a flowchart illustrating a learning process in the learning apparatus in FIG. 10.

Next, the classifying process in step S53 in FIG. 11 is described with reference to the flowchart in FIG. 13.

Although a description of processing in step S71 to step S76 is omitted since they are similar to step S21 to step S26 of the classifying process in the audio-signal broadening apparatus in FIG. 6, the processing multiplexes the class code based on the average power level $P_{AV}$ of the learner data and the class code based on the maximum power $B_n$.

In step S77, the class-code determining unit 36 (similar to the audio-signal broadening apparatus 1 in FIG. 2) increases the class code count determined in step S76, and outputs, to the integrating table 69, the count which indicates how often which class code occurs, before the classifying process ends.

As described above, the classifying process in the audio-signal broadening apparatus 1 and the classifying process in the learning apparatus 50 are similar to each other until the class codes are calculated. After that, both differ only in whether to calculate the class-occurrence frequency.

Figure 14:
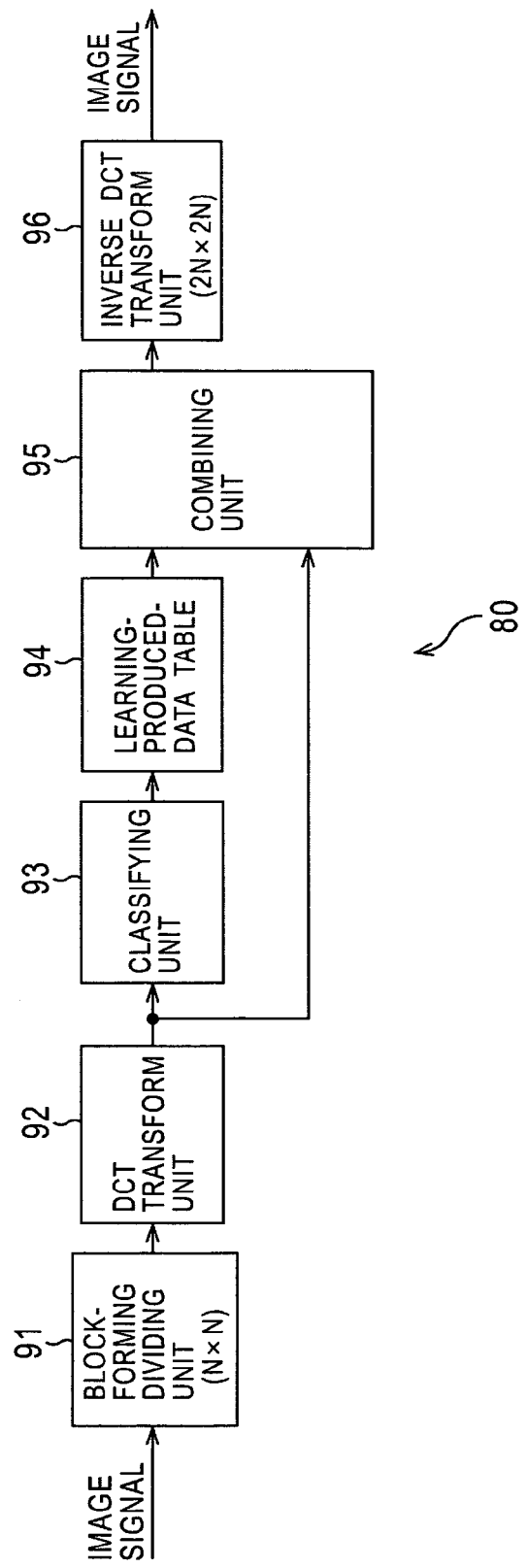
FIG. 14 is a block diagram showing an example of an image-signal broadening apparatus according to a second embodiment of the present invention.

FIG. 14 shows an example of an image-signal broadening apparatus according to a second embodiment of the present invention. In the above-described audio-signal broadening apparatus 1, an input signal is a one-dimensional audio signal and is processed in units of frames, while, in the image-signal broadening apparatus 80, an input signal is processed in units of blocks (e.g., 8×8 pixels) since it is a two-dimensional image signal. A block-forming diving unit 91, a DCT transform unit 92, a classifying unit 93, a learning-produced-data table 94, a combining unit 95, and an inverse DCT transform unit 96, in FIG. 14, have functions basically similar to those of the frame-unit dividing unit 11, the DCT transform unit 12, the classifying unit 13, the learning-produced-data table 14, the spectrum combining unit 16, and the inverse DCT transform unit 17, in FIG. 1. Accordingly, their descriptions are omitted. The gain adjusting unit 15 and the frame combining unit 18, shown in FIG. 1, are omitted since they are not always required in the case of the image signal.

FIG. 15 shows a detailed example of the classifying unit 93 in FIG. 14.

DCT data obtained by the M-DCT transform in the DCT transform unit 92 is input to a power-level-forming converting unit 101. The input DCT data is converted into a power level similarly to the above-described audio-signal broadening apparatus 1, and is further converted into a power decibel value. The value is output to a quantizing unit 102.

The quantizing unit 102 calculates, for DCT data in the DCT block, the average power level of alternating-current components and the position of DCT data corresponding to the peak value of the alternating-current components, and generates and outputs, to a class-code determining unit 103, a class code based on both.

The class-code determining unit 103 generates a class code by multiplexing class codes based on the quantized data of the input DCT block, and outputs and stores the class code in the learning-produced-data table 94 (FIG. 14).

Next, an image-broadening process in the image-signal broadening apparatus 80 is described. Since its flowchart is similar to that of the audio-signal broadening apparatus 1 in FIG. 3, it is described by referring to the flowchart in FIG. 3.

In step S1, the image signal which is input to the image-signal broadening apparatus 80 and which has suppressed high frequency components is divided in units of blocks (e.g., 2×2 pixels) by the image-signal broadening apparatus 80.

Figure 16A:
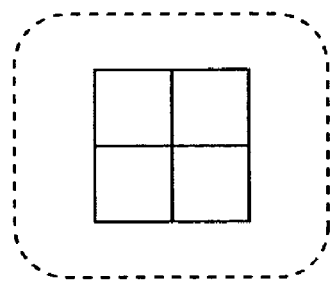
FIG. 16A is an illustration of an example of data in an image-signal broadening process.

In step s2, the DCT transform unit 92 performs an M-DCT transform on the image signal divided into blocks. FIG. 16A shows data (hereinafter referred to as DCT data) obtained such that the image signal of one block is M-DCT-transformed.

In step S3, the classifying unit 93 calculates class codes by performing a classifying process, which is described later with reference to FIG. 17.

Figure 16B:
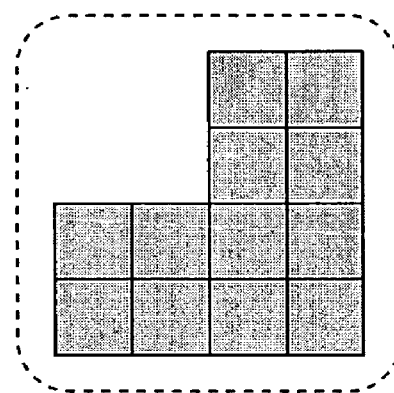
FIG. 16B is an illustration of an example of data in an image-signal broadening process.

In step S4, the learning-produced-data table 94 reads vector data items of DCT coefficients stored at addresses corresponding to the class codes output in step S3 by the classifying unit 93. FIG. 16B shows the vector data of DCT coefficients, which is read at this time and has high frequency components.

Figure 16C:
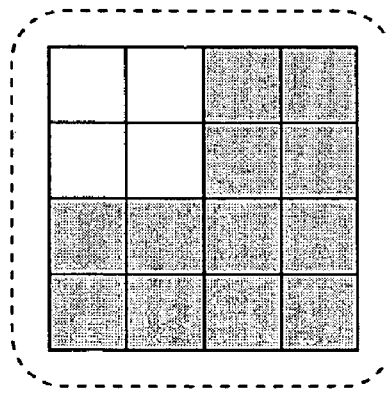
FIG. 16C is an illustration of an example of data in an image-signal broadening process.

In step S5, the combining unit 95 performs vector addition on the low-frequency-component DCT data (FIG. 16A) input to the image-signal broadening apparatus 80 and the high-frequency-component DCT data (FIG. 16B) read from the learning-produced-data table 94. FIG. 16C shows the combined DCT block data.

In step S6, the inverse DCT transform unit 96 performs an inverse M-DCT transform on the combined DCT data.

Since the overlapping in step S7 does not always need to be performed in the case of an image signal, as described above, the image-signal broadening process is terminated without performing processing in step S7.

Next, the classifying process which is performed by the classifying unit 93 is described with reference to the flowchart in FIG. 17.

In step S91, in a power-level converting unit 101, the DCT data input from the DCT transform unit 92 is converted into a power level and is further converted into a power decibel value. This processing is similar to that in the above case of the audio signal.

Figure 18:
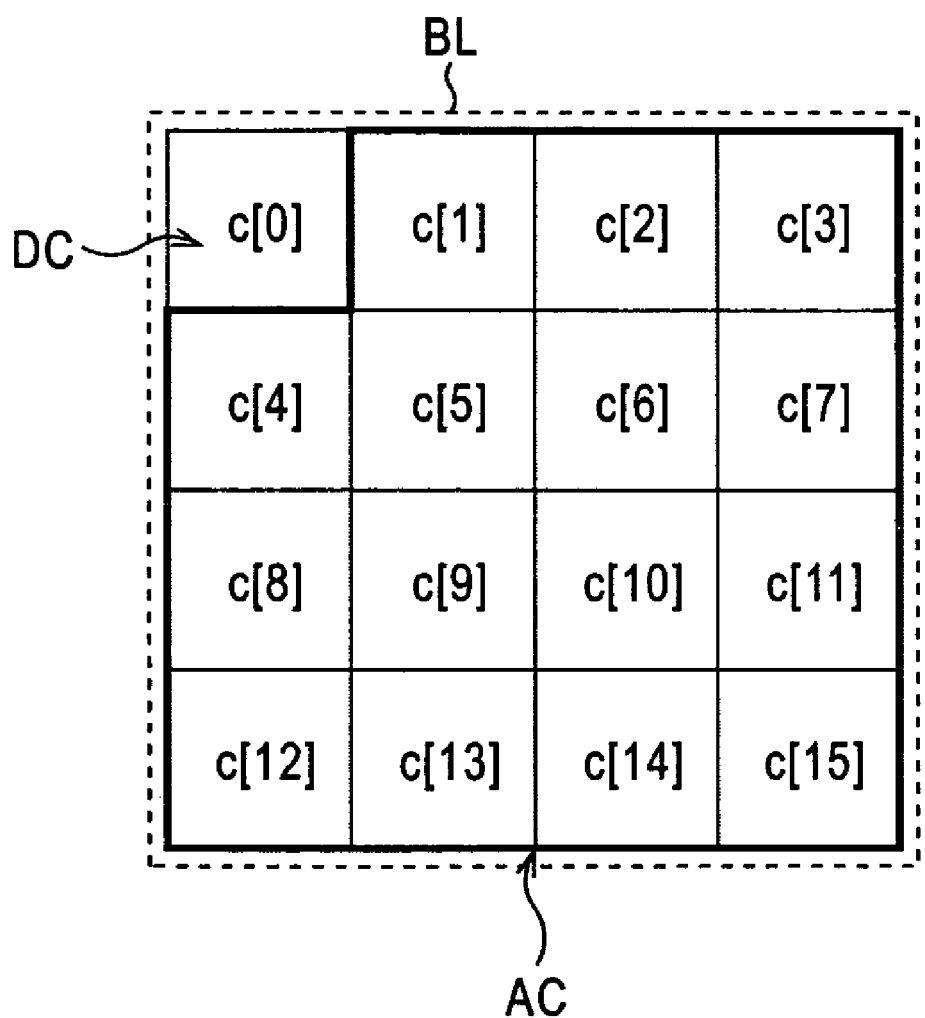
FIG. 18 is an illustration of processing in the step S92 in FIG. 17.

In step S92, the quantizing unit 102 calculates the alternating-current average power level and direct-current power level of the DCT block data, and detects an alternating-current-component peak power position. For example, a DCT block BL having 4×4 pixels as shown in FIG. 18 is input. The DCT data item of each pixel is c[n], and its power range is 0 to 127 [dB]. The alternating-current average power level is the average of DCT data items c[1] to c[15] in region AC in FIG. 18, and the direct-current power level is the value of DCT data item c[0] in region DC in FIG. 18. Also, the alternating-current component peak power position is any one of DCT data items c[1] to c[15] which has n (any of 1 to 15) when the power level is the maximum.

In step S93, the classifying unit 93 generates a class code by multiplexing the class codes found based on three values in step S92, and outputs the class code to the learning-produced-data table 94 before the classifying process ends. In the above case, there are 128 class codes based on the alternating-current average power level, 128 class codes based on the direct-current power level, and 15 class codes based on the alternating-current-component peak power position. Thus, any one of 128×128×15=245760 class codes in total is used.

Figure 19:
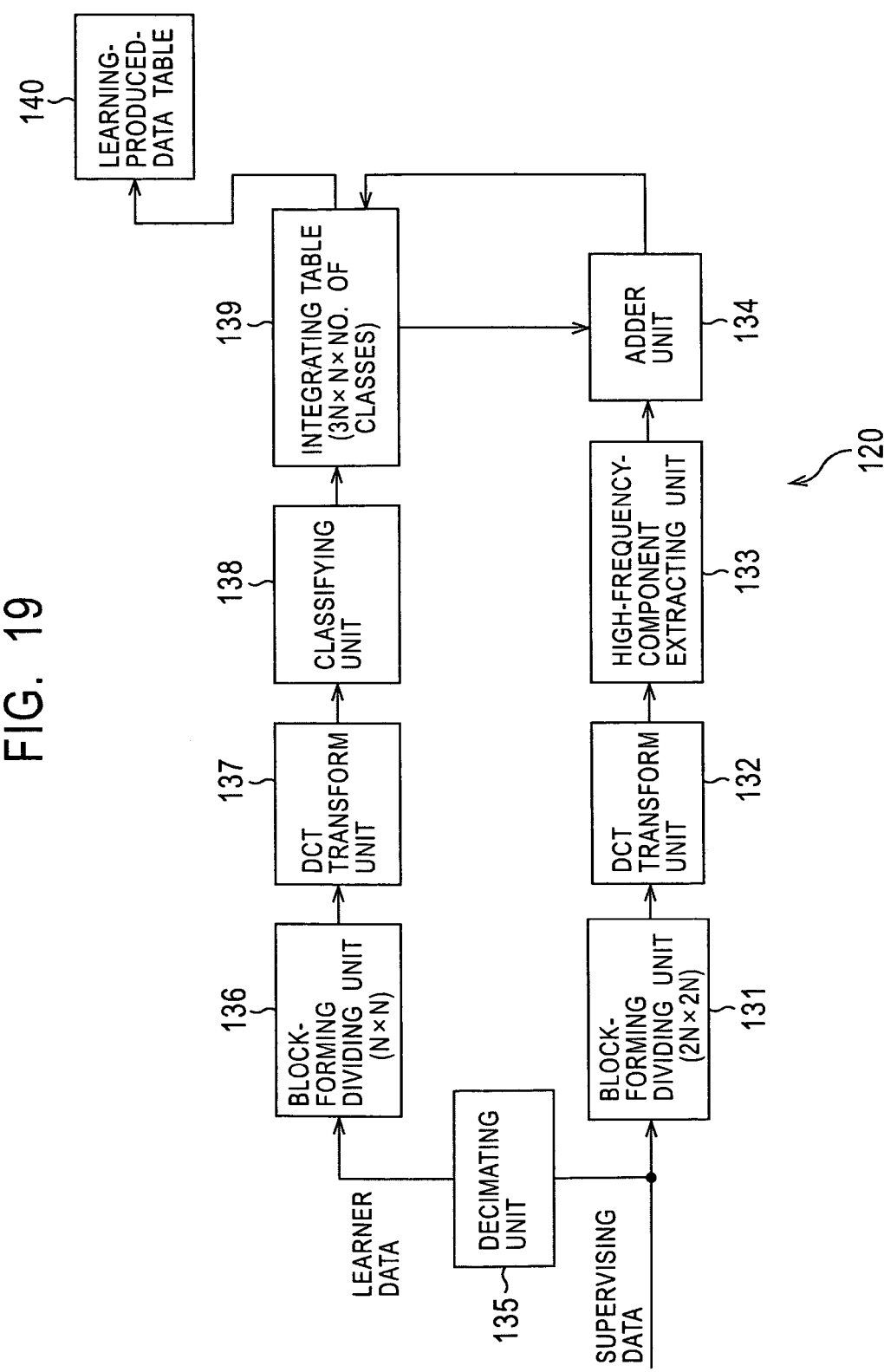
FIG. 19 is a block diagram showing an example of an image-signal learning apparatus.

FIG. 19 shows an example of a learning apparatus 120 that generates vector data items of high frequency components which are written in the learning-produced-data table 94 in the image-signal broadening apparatus 80. Since a block-forming dividing unit 131, a DCT transform unit 132, a highfrequency-component extracting unit 133, an adder unit 134, a decimating circuit 135, a block-forming dividing unit 136, a DCT transform unit 137, a classifying unit 138, and an integrating table 139, in FIG. 19, have structures and functions basically similar to those of the frame-unit dividing unit 61, the DCT transform unit 62, the high-frequency-component extracting unit 63, the adder unit 64, the decimating circuit 65, the frame-unit dividing unit 66, the DCT transform unit 67, the classifying unit 68, and the integrating table 69, in FIG. 10, their descriptions are omitted.

Next, the learning process of the learning apparatus 120 is described. Since its flowchart is similar to that of the audio-signal broadening apparatus 1 in FIG. 11, it is described by referring to the flowchart in FIG. 11.

In step S51, DCT data of supervising data and DCT data of learner data are divided into blocks. In other words, the block-forming dividing unit 131 forms input supervising data into blocks for each set of 2N×2N pixels. The decimating circuit 135 generates learner data by extracting only low frequency components from the supervising data and alternately decimating the low frequency components in each of the horizontal direction and the vertical direction. The block-forming dividing unit 136 divides the learner data into blocks for each set of N×N pixels.

Figure 20A:
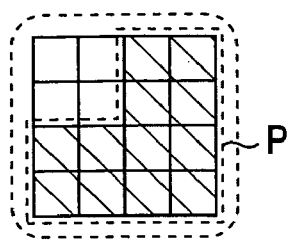
FIG. 20A is an illustration of an example of image-signal data in the learning process.
Figure 20B:
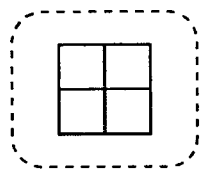
FIG. 20B is an illustration of an example of image-signal data in the learning process.

In step S52, the DCT transform unit 132 and the DCT transform unit 137 perform M-DCT transforms on the supervising data and the learner data. FIG. 20A shows DCT data (4×4 data items) obtained after the supervising data is M-DCT-transformed, and FIG. 20B shows DCT data (2×2 data items) obtained after the learner data is M-DCT-transformed.

Figure 21:
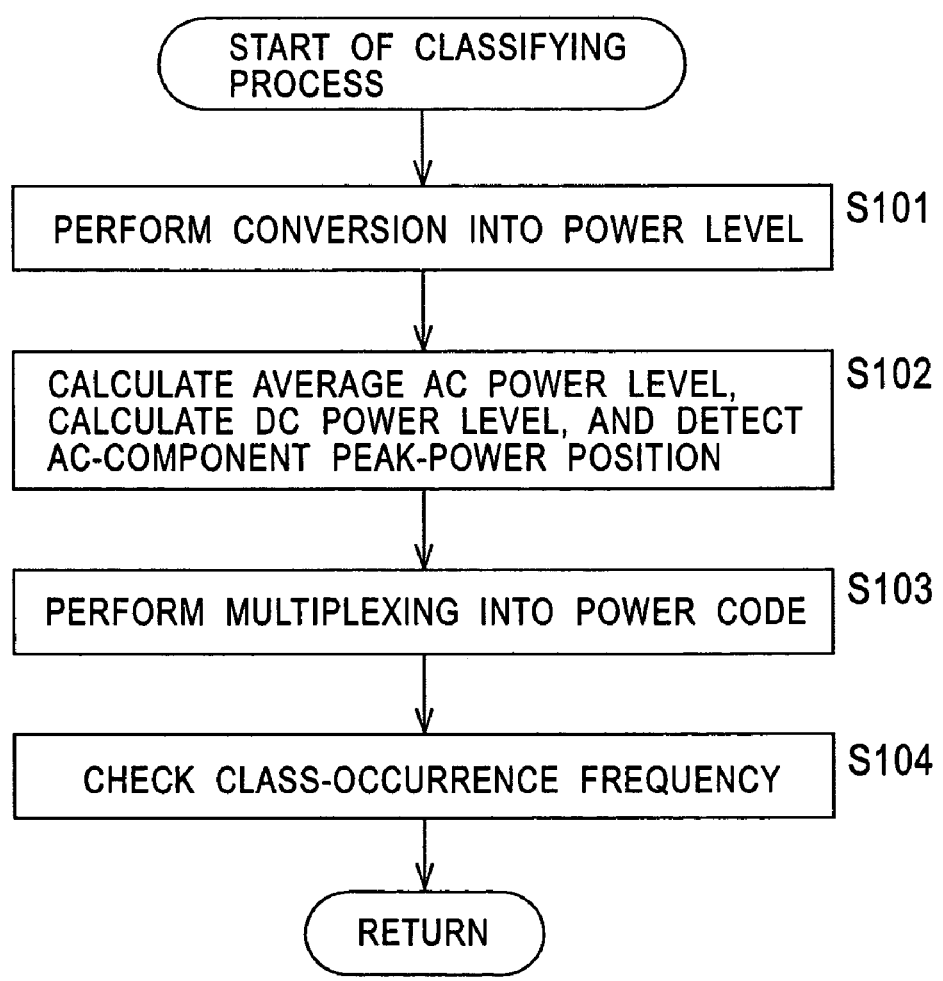
FIG. 21 is a flowchart illustrating a classifying process in the learning apparatus in FIG. 19.

In step S53, the classifying unit 138 performs, on the DCT data as the learner data, a classifying process, which is described later with reference to the FIG. 21, and calculates and outputs occurrence frequencies of a class code and the class to the integrating table 139.

In step S54, the integrating table 139 reads a vector data item which is stored at an address corresponding to the class code output by the classifying unit 138.

Figure 20C:
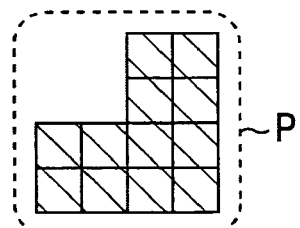
FIG. 20C is an illustration of an example of image-signal data in the learning process.

In step s55, the high-frequency-component extracting unit 133 extracts high frequency components of the supervising data. FIG. 20C shows the extracted high frequency components, which correspond to part P (part of the 4×4 pixels excluding top-left 2×2 pixels) of the entirety of the supervising data in FIG. 20A.

Figure 20D:
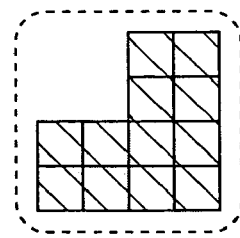
FIG. 20D is an illustration of an example of image-signal data in the learning process.
Figure 20E:
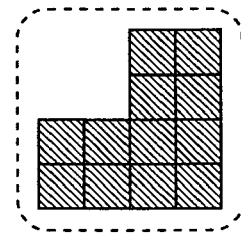
FIG. 20E is an illustration of an example of image-signal data in the learning process.

In step S56, the adder unit 134 performs vector addition of the vector data (the data shown in FIG. 20D) read from the integrating table 139 in step S54 and the high-frequency-component vector data (the data shown in FIG. 20C) extracted from the supervising data in step S55. FIG. 20E shows DCT data obtained after the vector addition is performed in step S56.

In step S57, the adder unit 134 stores the vector data (the data shown in FIG. 20E) calculated in step S56 at the position of the address of the same class code when the integrating table 139 is read.

In step S58, it is determined whether the learning process has ended. When it is determined that the learning process has not ended, the process returns to step S51, and the subsequent processing is repeated. When it is determined that the learning process has ended, the process proceeds to step S59.

When it is determined in step S58 that the learning process has ended, in step S59, the integrating table 139 calculates the average of vector data items by dividing (3N×N) vector data items at the addresses of class codes by a class-occurrence frequency of the corresponding class code which is output from the classifying unit 138, and outputs the average to the learning-produced-data table 140 before the process ends.

Figure 20F:
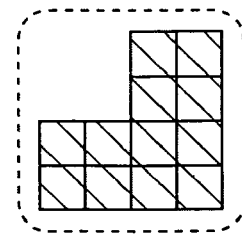
FIG. 20F is an illustration of an example of image-signal data in the learning process.

FIG. 20F shows, in the form of a DCT block, the (3N×N) vector data items stored at the address of one class code in the learning-produced-data table 140.

Next, the classifying process which is performed by the classifying unit 138 in FIG. 19 is described with reference to the flowchart in FIG. 21.

Figure 17:
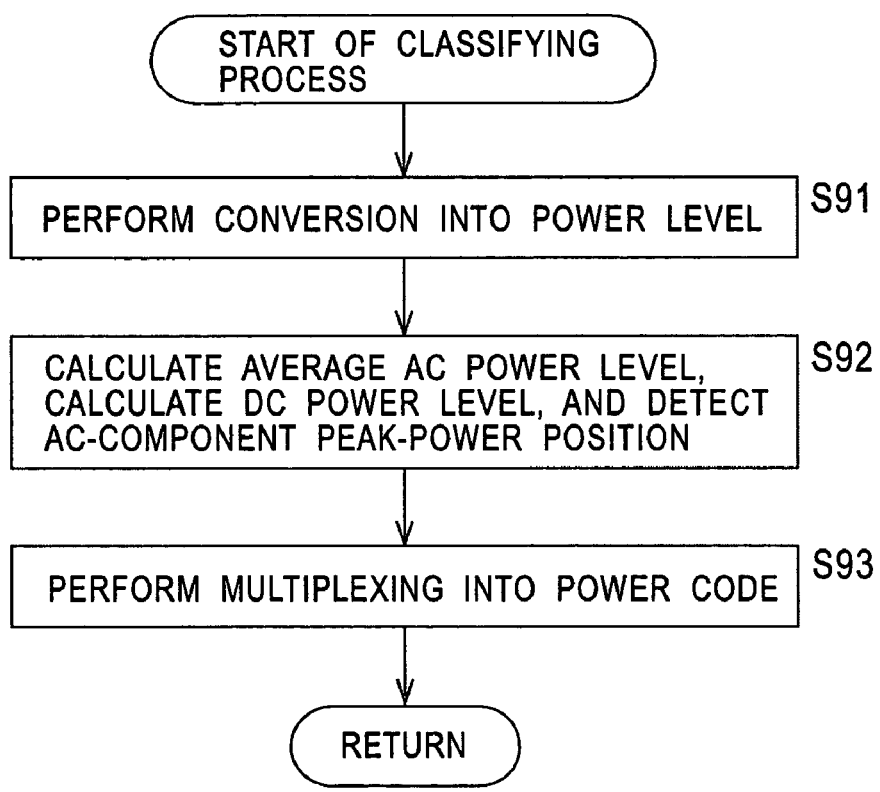
FIG. 17 is a flowchart illustrating a classifying process in the image-signal broadening process in FIG. 14.

Since processing from step S101 to step S103 are similar to step S91 to step S93 in the classifying process in the image-signal broadening apparatus in FIG. 17, its description is omitted. In other words, processing of calculating the class code is performed similarly to the image-signal broadening apparatus. By this processing, class codes based on the alternating-current average power level, the direct-current power level, and the alternating-current-component peak-power position are multiplexed into one class code.

In step S104, the class-code determining unit 103 increases the class code count determined in step S103 by one, and outputs, to the integrating table 139, the count, which indicates how often which class code occurs before the classifying process ends.

Figure 22:
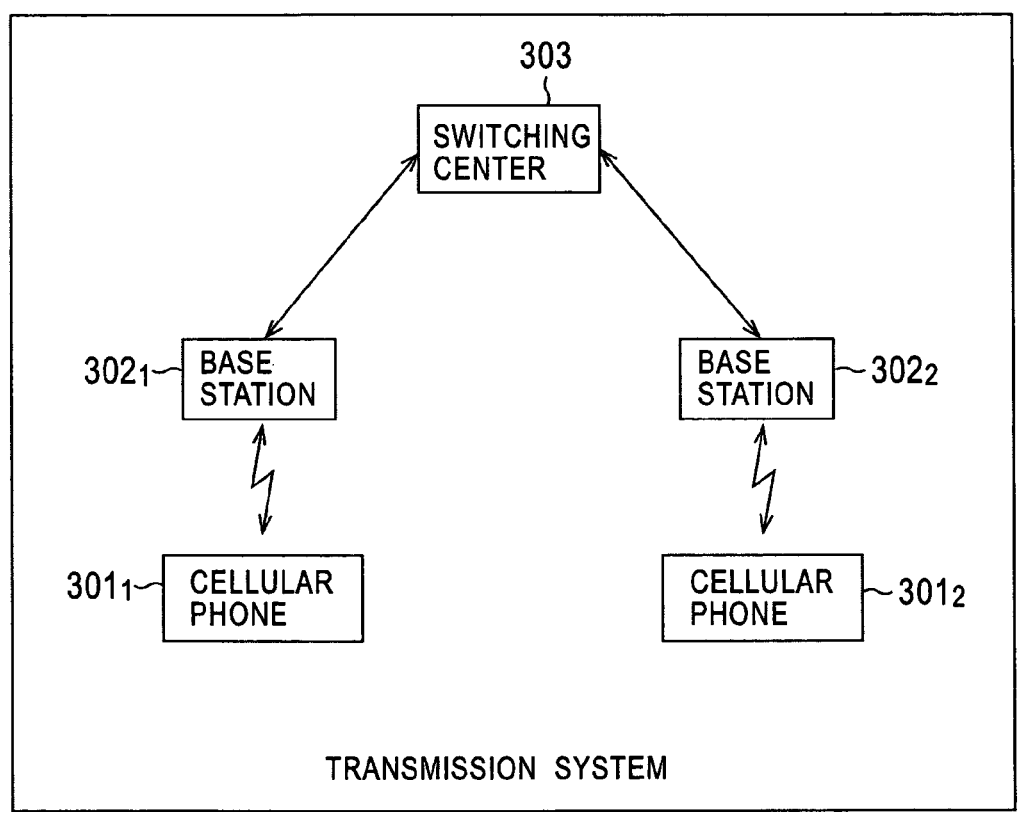
FIG. 22 is a block diagram showing an example of a transmission system according to a third embodiment of the present invention.

FIG. 22 shows the configuration of a transmission system (the system means a logical set of a plurality of apparatuses, and is irrespective of a state in which apparatuses having structures are in the same housing) according to a third embodiment of the present invention.

In this transmission system, cellular phones $301_1$ and $301_2$ perform radio transmission and reception with base stations $302_1$ and $302_2$, and each of the base stations $302_1$ and $302_2$ performs transmission and reception with a switching center 303, whereby audio transmission and reception between the cellular phones $301_1$ and $301_2$ can be performed by using the base stations $302_1$ and $302_2$ and the switching center 303. The base stations $302_1$ and $302_2$ may be the same base station and may be different base stations.

The base stations $302_1$ and $302_2$ are hereinafter referred to as the cellular phone 301 unless they particularly need to be distinguished.

Figure 23:
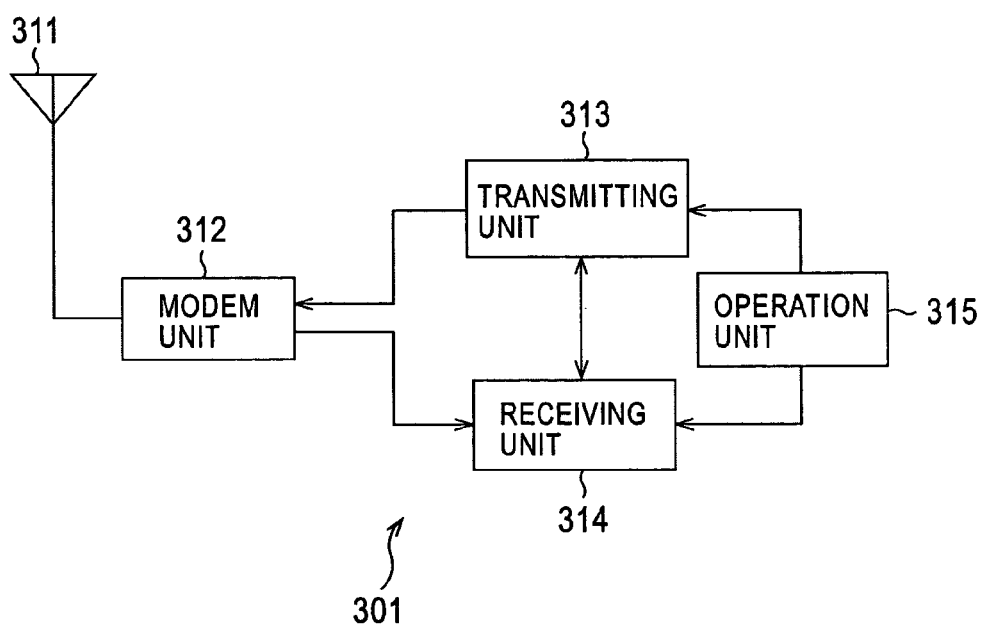
FIG. 23 is a block diagram showing an example of the cellular phone in FIG. 22.

FIG. 23 shows an example of the cellular phone $301_1$ in FIG. 22. Since the cellular phone $301_2$ is also similar in structure to the cellular phone $301_1$, which is described below, its description is omitted.

An antennal 311 receives radio waves from the base station $302_1$ or $302_2$, and supplies the received signal to a modem unit 312, while it transmits a signal from the modem 312 to the base station $302_1$ or $302_2$ by radio. The modem unit 312 demodulates the signal from the antenna 311 by using, for example, a CDMA (Code Division Multiple Access) method or the like, and supplies the resultant demodulated signal to a receiving unit 314. Also, the modem unit 312 modulates the transmitting data supplied from the transmitting unit 313 by using, for example, a CDMA method or the like, and supplies the resultant modulated signal to the antenna 311. A transmitting unit 313 obtains transmitting data by performing predetermined processing such as coding of an input user's voice, and supplies the data to the modem unit 312. The receiving unit 314 receives received data as the demodulated signal from the modem unit 312, performs decoding, and outputs high quality audio.

An operation unit 315 is operated by the user when the user inputs the telephone number of a calling destination, a predetermined command, or the like, and an operation signal corresponding to the operation is supplied to the transmitting unit 313 and the receiving unit 314.

Information can be exchanged between the transmitting unit 313 and the receiving unit 314, if needed.

Figure 24:
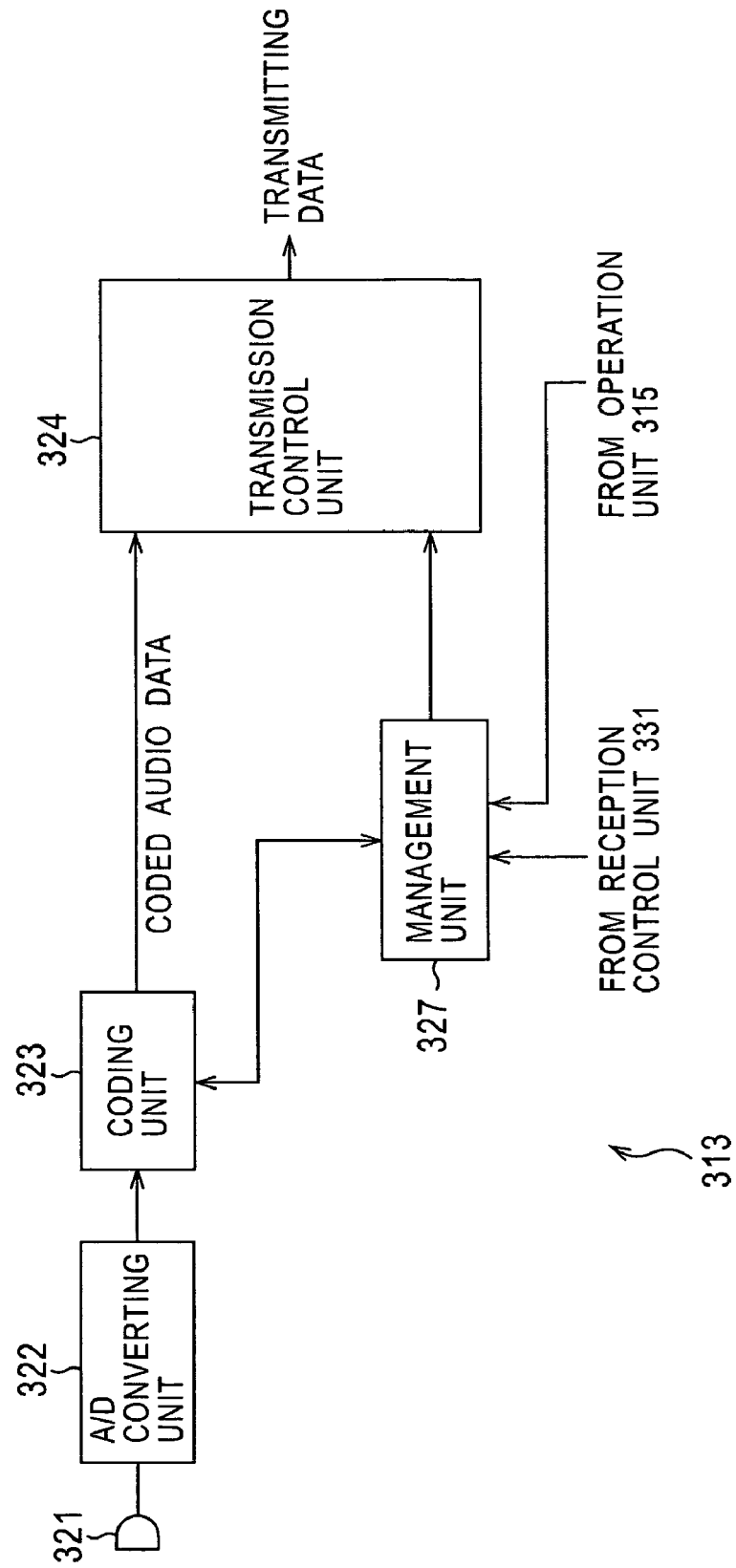
FIG. 24 is a block diagram showing an example of the transmitting unit in FIG. 23.

FIG. 24 shows an example of the transmitting unit 313 in FIG. 23.

The user's voice is input to a microphone 321, and the microphone 321 outputs the user's voice in the form of an audio signal as an electric signal to an A/D (Analog/Digital) converting unit 322. The A/D converting unit 322 performs A/D conversion on the analog audio signal from the microphone 321 into digital audio data, and outputs the data to a coding unit 323.

The coding unit 323 uses predetermined coding to encode the audio data from the A/D converting unit 322, multiplexes class codes, and outputs the resultant coded audio data to a transmission control unit 324.

A management unit 327 manages the telephone number of the calling destination, the telephone number of the cellular phone as a calling party, and other necessary information, which are input by operating the operation unit 315, if needed, and outputs these to the coding unit 323 and the transmission control unit 324.

The transmission control unit 324 performs transmission control of the coded audio data output by the coding unit 323 and the data output by the management unit 327. In other words, the transmission control unit 324 selects the coded audio data output by the coding unit 323 or the data output by the management unit 327, and outputs the selected data as transmitting data to the modem unit 312 (FIG. 23).

Figure 25:
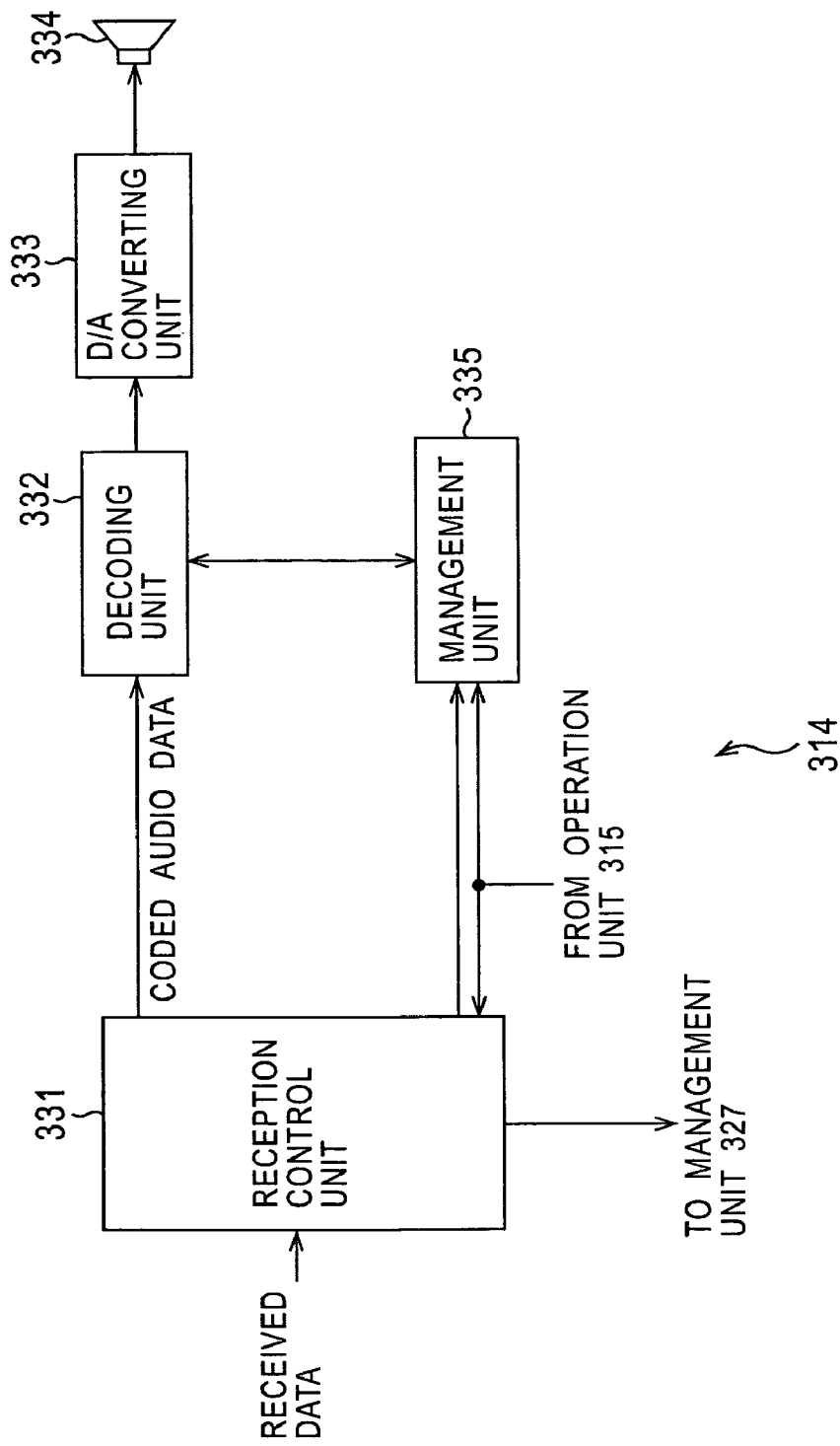
FIG. 25 is a block diagram showing an example of the receiving unit in FIG. 23.

FIG. 25 shows an example of the receiving unit 314 in FIG. 23.

The received data as a demodulated signal output by the modem unit 312 in FIG. 23 is supplied to a reception control unit 331, and the reception control unit 331 receives the received data. When the received data is coded audio data, the reception control unit 331 supplies the coded audio data to a decoding unit 332. Alternatively, when the received data is the telephone number of the calling party or other information, the reception control unit 331 supplies such information to a management unit 335 or (the management unit 327 of) the transmitting unit 313, if needed.

The decoding unit 332 separates the coded audio data supplied by the reception control unit 331 from class codes, or adds high frequency components, and supplies the resultant decoded audio data to a D/A (Digital/Analog) converting unit 333.

The D/A converting unit 333 performs D/A conversion on the decoded audio data in digital form output by the decoding unit 332 and supplies the resultant analog audio signal to a speaker 334. The speaker 334 outputs audio corresponding to the audio signal from the D/A converting unit 333.

When receiving a call, a management unit 335 receives the telephone number of the transmitting end and supplies the received telephone number to the decoding unit 332.

Figure 26:
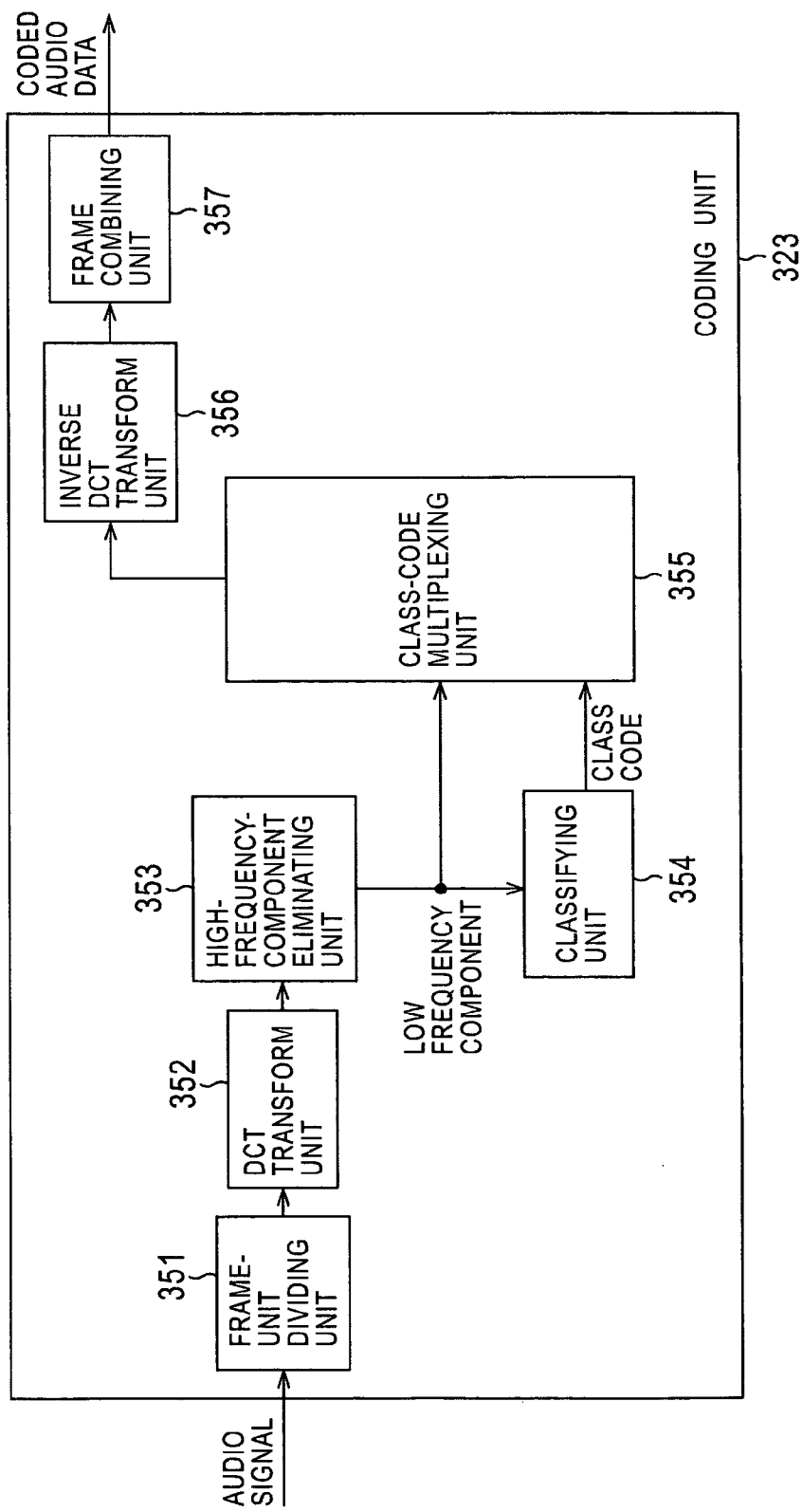
FIG. 26 is a block diagram showing an example of the coding unit in FIG. 24 in a case in which a learning-produced-data table is supplied as fixed information.
Figure 27:
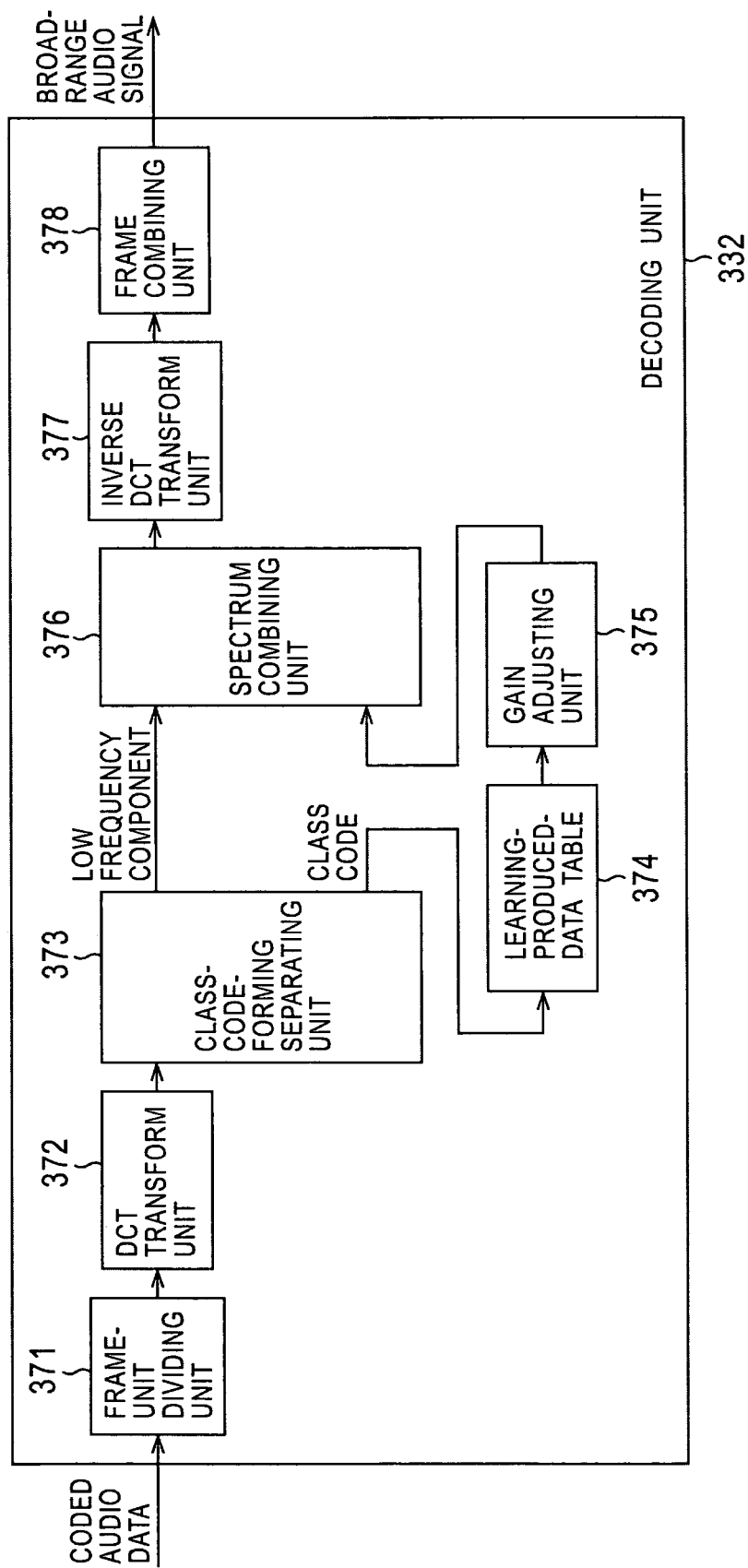
FIG. 27 is a block diagram showing an example of the decoding unit in FIG. 25 in a case in which the learning-produced-data table is supplied as fixed information.

FIG. 26 and FIG. 27 show examples of the coding unit 323 and the decoding unit 332, respectively, in a case in which a learning-produced-data table is supplied as fixed information.

At first, the structure of the coding unit 323 in FIG. 26 is described.

Since the functions of a frame-unit dividing unit 351 and a DCT transform unit 352 are similar to those of the frame-unit dividing unit 11 and DCT transform unit 12 of the audio-signal broadening apparatus 1 in FIG. 1, their descriptions are omitted.

A high-frequency-component eliminating unit 353 outputs, to a classifying unit 354 and a class-code multiplexing unit 355, low frequency components generated by eliminating high frequency components of the input DCT spectrum data. A compression ratio is dependent on an eliminating ratio of the high frequency components. For example, when a band is compressed to half, the amount of data is reduced to ½. One obtained by adding, to the reduced data amount, a data amount of several words to be multiplexed by the class-code multiplexing unit 355, which is described later, is a final data amount.

The classifying unit 354 performs a classifying process similar to that in the case of the classifying unit 13 in the audio-signal broadening apparatus 1, on the low-frequency-component DCT spectrum data input from the high-frequency-component eliminating unit 353, and outputs class codes to the class-code multiplexing unit 355.

The class-code multiplexing unit 355 multiplexes the class code output from the classifying unit 354 and the low-frequency-component DCT spectrum data output from the high-frequency-component eliminating unit 353, and outputs the multiplexed data to an inverse DCT transform unit 356. By performing multiplexing of the class code with the low-frequency-component DCT spectrum data, resistance to error on a class-code code-transmission path can be enhanced, and by checking a degree of coincidence between a class code obtained by performing the classifying process again in the decoding unit 332 (FIG. 27) and the multiplexed class code, error detection and correction for the multiplexed class code can be performed.

The inverse DCT transform unit 356 performs an inverse M-DCT transform on data in which the input class code and the low-frequency-component DCT spectrum data are multiplexed, and outputs the result to a frame combining unit 357.

The frame combining unit 357 performs overlapping similar to that in the case of the frame combining unit 18 in the audio-signal broadening apparatus 1, and outputs the obtained data as coded audio data to the transmission control unit 324 (FIG. 24).

Next, the structure of the decoding unit 332 in FIG. 7 is described.

Since a frame-unit dividing unit 371 and a DCT transform unit 372 have functions similar to those of the frame-unit dividing unit 11 and the DCT transform unit 12 in the audio-signal broadening apparatus 1 in FIG. 1, their descriptions are omitted.

A class-code-forming separating unit 373 separates the multiplexed DCT spectrum data into a class code and low-frequency-component DCT spectrum data, and outputs the low-frequency-component DCT spectrum data to a spectrum combining unit 376 and outputs the class code to a learning-produced-data table 374.

The learning-produced-data table 374 reads and outputs, to a gain adjusting unit 375, high-frequency-component DCT spectrum data stored at an address corresponding to the class code output by the class-code-forming separating unit 373.

Similarly to the gain adjusting unit 15 in the audio-signal broadening apparatus 1, the gain adjusting unit 375 performs gain adjustment on the high-frequency-component DCT spectrum data output by the learning-produced-data table 374 so as to match the gain of the high-frequency-component spectrum to be combined in the spectrum combining unit 376, and outputs the result to the spectrum combining unit 376.

The spectrum combining unit 376 combines the low-frequency-component DCT spectrum data output by the class-code-forming separating unit 373 and the high-frequency-component DCT spectrum data output by the gain adjusting unit 375, and outputs the combined data to the inverse DCT transform unit 377.

The inverse DCT transform unit 377 performs an inverse M-DCT transform on the input spectrum data, and outputs the transformed data to a frame combining unit 378.

The frame combining unit 378 performs overlapping of frames, and outputs the result as a broad-range audio signal to the D/A converting unit 333.

Figure 28:
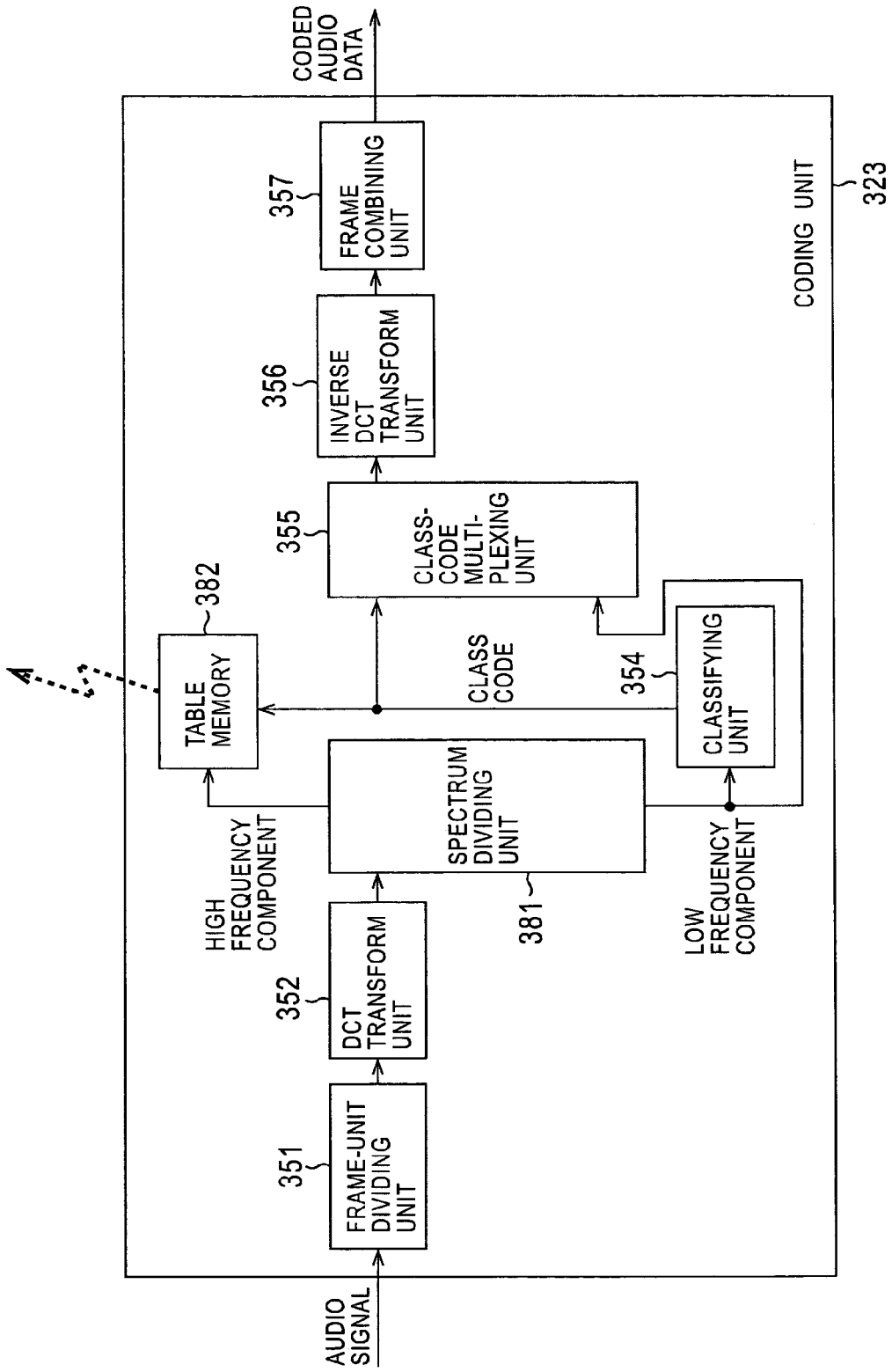
FIG. 28 is a block diagram showing an example of the coding unit in FIG. 24 in a case in which the learning-produced-data table is updated with predetermined timing.
Figure 29:
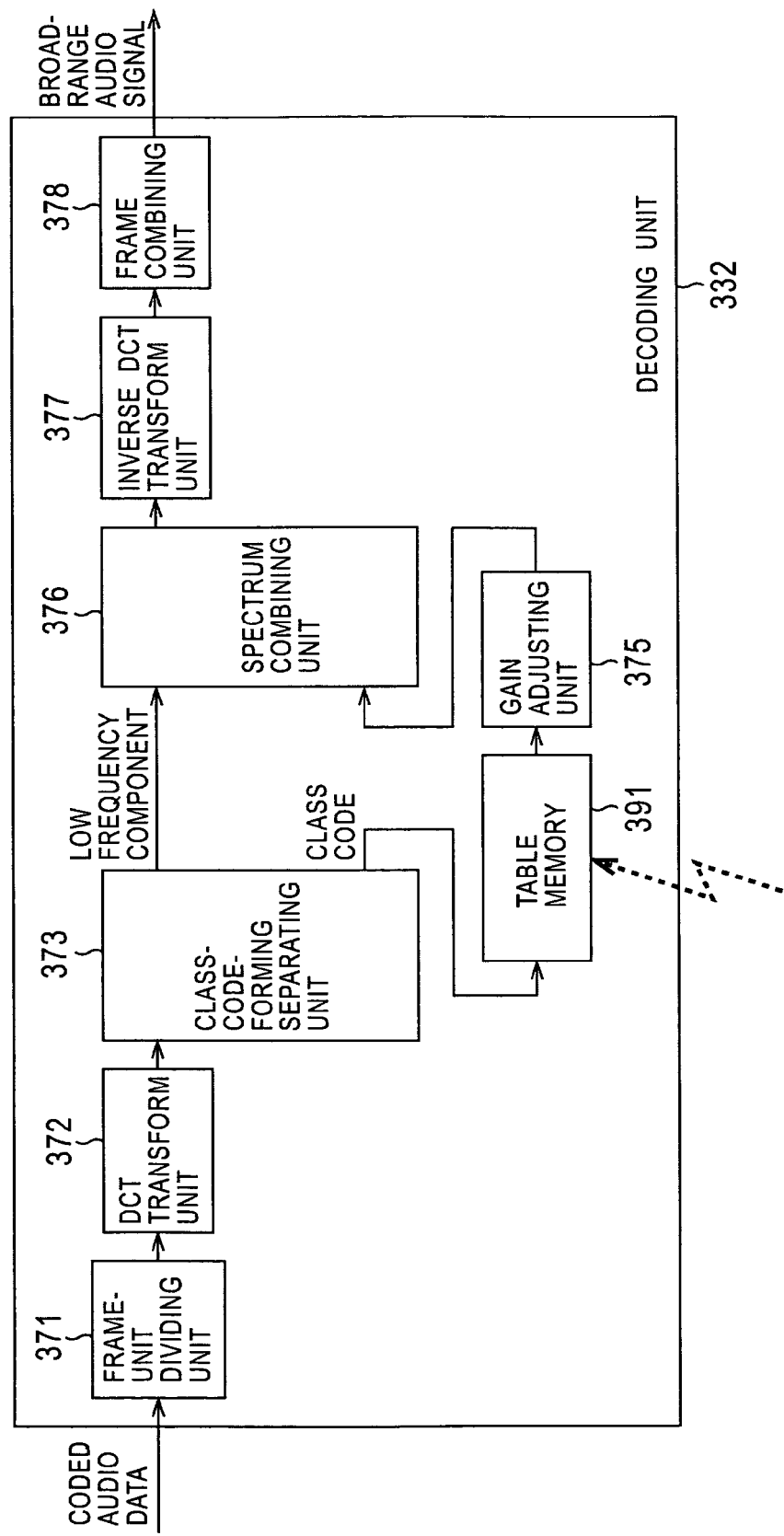
FIG. 29 is a block diagram showing an example of the decoding unit in FIG. 25 in a case in which the learning-produced-data table is updated with predetermined timing.

In addition, FIG. 28 and FIG. 29 show examples of the coding unit 323 and the decoding unit 332, respectively, in a case in which a learning-produced-data table for storing high-frequency-component spectrum data is stored so as to be correlated with the telephone number of each transmitting end and table information is updated for each use. Portions corresponding to those in the case of FIG. 26 and FIG. 27 are denoted by identical reference numerals, and their descriptions are omitted.

At first, the structure of the coding unit 323 in FIG. 28 is described.

A spectrum dividing unit 381 separates the input DCT spectrum data into a high frequency component and a low frequency component, and outputs the high frequency component to a table memory 382 and outputs the low frequency component to a classifying unit 354 and a class-code multiplexing unit 355.

The classifying unit 354 calculates a class code, and outputs the class code to the table memory 382 and the class-code multiplexing unit 355.

The table memory 382 stores, at an address corresponding to the class code output by the classifying unit 354, the high-frequency-component DCT spectrum data input from the spectrum dividing unit 381. The content of this table memory is transferred with predetermined timing to a table memory 391 (FIG. 29) of the decoding unit 332, which is described later.

In the coding unit 323 having the above structure, whenever a call is made, high-frequency-component DCT spectrum data for each calling party is stored in the table memory 382. Because the content of the table memory 382 is a type of statistical information, it is expected that, as more information is input, the information will converges to an appropriate deviation in units of class codes. Based on this effect, an increased number of times the content is used, more accurate decoding comes to be performed. The other components in FIG. 28 are similar to those in the case of FIG. 26.

Next, the structure of the decoding unit 332 in FIG. 29 is described.

A table memory 391 reads and outputs, to the gain adjusting unit 375, the high-frequency-component DCT spectrum data stored at the position designated as the address corresponding to the class code output by the class-code-forming separating unit 373.

The operation of the cellular phone 301, in a case in which a learning-produced-data table is stored in a form correlated with the telephone number of the transmitting end and is updated with predetermined timing, as shown by the structures in FIG. 28 and FIG. 29, is described.

At first, a transmitting process that the transmitting unit 313 in the cellular phone $301_1$ performs is described with reference to the flowchart in FIG. 30.

In step S201, when the user operates the operation unit 315 (FIG. 23) to input the telephone number of the cellular phone $301_2$ as a call receiving end, the management unit 327 detects the start of a call.

In step S202, the transmitting unit 313 performs a memory-data transmitting process, which is described with reference to FIG. 31. In other words, the transmitting unit 313 transmits, to the table memory 391 (FIG. 29) of the cellular phone $301_2$ at the call receiving end, the high-frequency-component DCT spectrum data stored in the table memory 382 (FIG. 28), and switches to a voice call.

In step S203, the microphone 321 receives an input user's voice.

In step S204, the A/D converting unit 322 performs A/D conversion on the audio signal input from the microphone 321 and outputs the converted signal as a digital audio signal to the coding unit 323.

In step S205, the coding unit 323 performs a coding process. Its details are described later with reference to FIG. 32. This process divides the audio signal input from the A/D converting unit 322 into a high frequency component and a low frequency component. The high frequency component is stored in the table memory 382, and the low frequency component is multiplexed with a class code and is output as coded audio data to the transmission control unit 324.

In step S206, the transmission control unit 324 transmits, to the modem unit 312 (FIG. 23), the coded audio data input from the coding unit 323.

In step S207, the management unit 327 determines whether the call has ended. When it is determined that the call has not ended, the management unit 327 returns the process to step S203 and the subsequent steps are repeated. When it is determined that the call has ended, the management unit 327 terminates the transmitting process.

Figure 30:
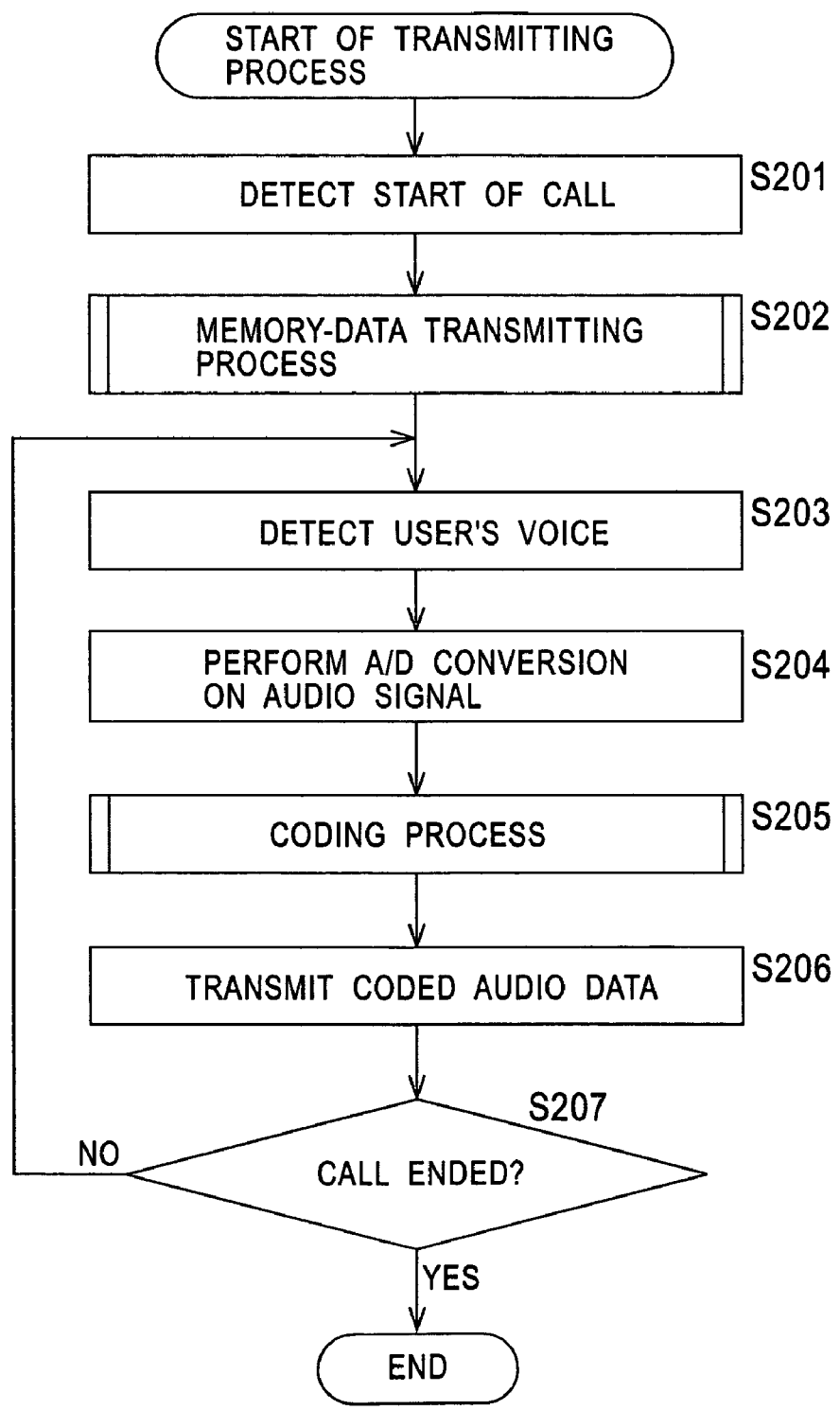
FIG. 30 is a flowchart illustrating a transmitting process in the transmitting unit in FIG. 24.

Next, the memory-data transmitting process in step S202 in FIG. 30 is described with reference to the flowchart in FIG. 31.

In step S221, the transmission control unit 324 outputs, as transmitting data, the telephone number of the cellular phone $301_2$ input by operating the operation unit 315, whereby calling to the cellular phone $301_2$ is performed.

After the user of the cellular phone $301_2$ operates the operation unit 315 to set the cellular phone $301_2$ to be in an off-hook state in response to calling by the cellular phone $301_1$, the process proceeds to step S222. The transmission control unit 324 establishes a communication link with the cellular phone $301_2$ at the call receiving end, and proceeds to step S223.

In step S223, the management unit 327 reads and supplies data stored in the table memory 382 in the coding unit 323 to the transmission control unit 324. In step S223, the transmission control unit 324 selects the memory data from the management unit 327 and transmits the data as transmitting data. The memory data is transmitted with updating information representing a date and time of obtainment of the memory data.

After that, the process proceeds from step S223 to S224, and the management unit 327 determines whether a ready-completion notification has been transmitted from the cellular phone $301_2$ at the call receiving end.

Specifically, after the cellular phone $301_2$ at the call receiving end is in a state enabling a normal voice call, it can transmit a ready-completion notification representing completion of readiness of the voice call (in step S277 in FIG. 34, which is described later). In step S224, it is determined whether the ready-completion notification has been transmitted from the cellular phone $301_2$.

When it is determined in step S224 that the ready-completion notification has not been transmitted, the process returns to step S224 and waits for the ready-completion notification to be transmitted.

When it is determined in step S224 that the ready-completion notification has been transmitted, the process proceeds to step S225, and the transmission control unit 324 terminates the memory-data transmitting process by selecting an output from the coding unit 323 so that a voice call is possible.

Figure 32:
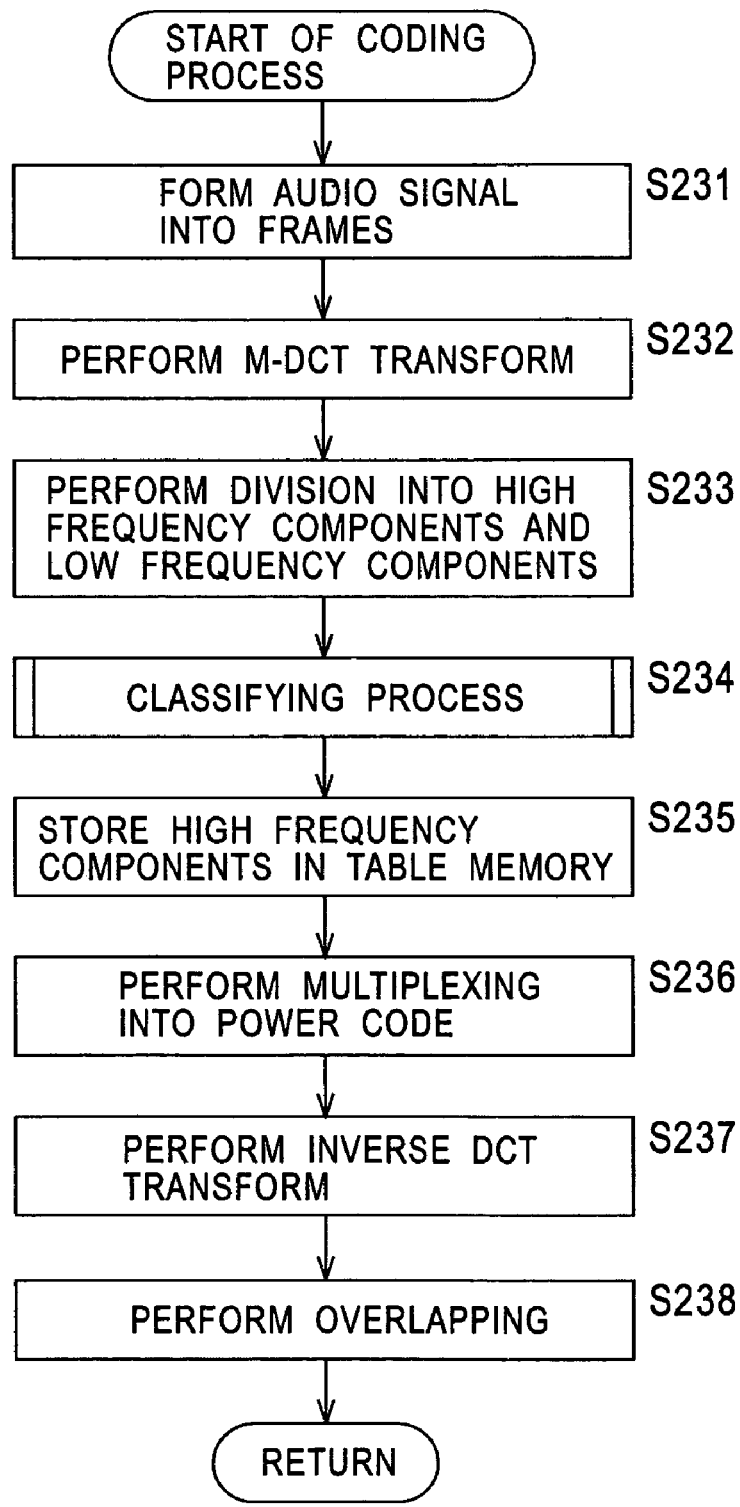
FIG. 32 is a flowchart illustrating an coding process in the step S205 in FIG. 30.

Next, the coding process in step S205 in FIG. 30 is described with reference to the flowchart in FIG. 32.

In step S231, the frame-unit dividing unit 351 divides the audio signal input from the A/D converting unit 322 into frames. The input audio signal has both high frequency components and low frequency components.

In step S232, the DCT transform unit 352 performs a M-DCT transform on the audio signal divided into frames in step S231, and outputs the transformed signal as DCT spectrum data to the spectrum dividing unit 381.

In step S233, the spectrum dividing unit 381 divides the DCT spectrum data into a high frequency component and a low frequency component, and outputs the high frequency component to the table memory 382 and outputs the low frequency component to the classifying unit 354.

In step S234, the classifying unit 354 determines a class code by the cellular phone, and outputs the class code to the class-code multiplexing unit 355 and the table memory 382. Since the classifying process is similar to the classifying process in the audio-signal broadening apparatus 1 described using FIG. 6, its description is omitted.

In step S235, the table memory 382 stores, at an address corresponding to the class code output by the classifying unit 354, the high-frequency-component DCT spectrum data input from the spectrum dividing unit 381.

In step S236, the class-code multiplexing unit 355 multiplexes the class code input from the classifying unit 354 and the low-frequency-component DCT spectrum data input from the spectrum dividing unit 381, and outputs the multiplexed result to the inverse DCT transform unit 356.

In step S237, the inverse DCT transform unit 356 performs an inverse DCT transform on the multiplexed low-frequency-component DCT spectrum data.

Finally, in step S238, the frame combining unit 357 performs overlapping to generate coded audio data.

Next, a receiving process that is performed by the receiving unit 314 in the cellular phone $301_2$ at the call receiving end in response to the transmitting process in FIG. 30 performed by the cellular phone $301_1$ at the transmitting end is described with reference to FIG. 33.

In step S251, the management unit 335 detects reception of radio waves by using the reception control unit 331.

In step S252, the receiving unit 314 performs a memory-data updating process, which is described with reference to FIG. 34. In other words, the receiving unit 314 updates the high-frequency-component DCT spectrum data stored in the table memory 391 (FIG. 29), and switches to a voice call (coded audio data).

After the received data input to the reception control unit 331 is switched to the coded audio data in step S253, the reception control unit 331 outputs the coded audio data to the decoding unit 332.

In step S254, the decoding unit 332 performs decoding. Its details are described with reference to FIG. 35. By performing this processing, the decoding unit 332 separates the class-code-multiplexed coded audio data into a class code and a low frequency component. It reads the high frequency component stored at an address corresponding to the class code, combines the read component with the low frequency component, and outputs the combined component as a broad-range audio signal.

In step S255, the D/A converting unit 333 performs D/A conversion on the input broad-range audio signal input from the decoding unit 332 and outputs the converted signal to the speaker 334. In step S256, the speaker 334 outputs the analog audio signal input from the D/A converting unit 333.

In step S257, the management unit 335 determines whether the call has ended. When it is determined that the call has not ended, the management unit 335 returns the process to step S253 and the subsequent processing is repeated. When it is determined that the call has ended, the management unit 335 terminates the receiving process.

Figure 33:
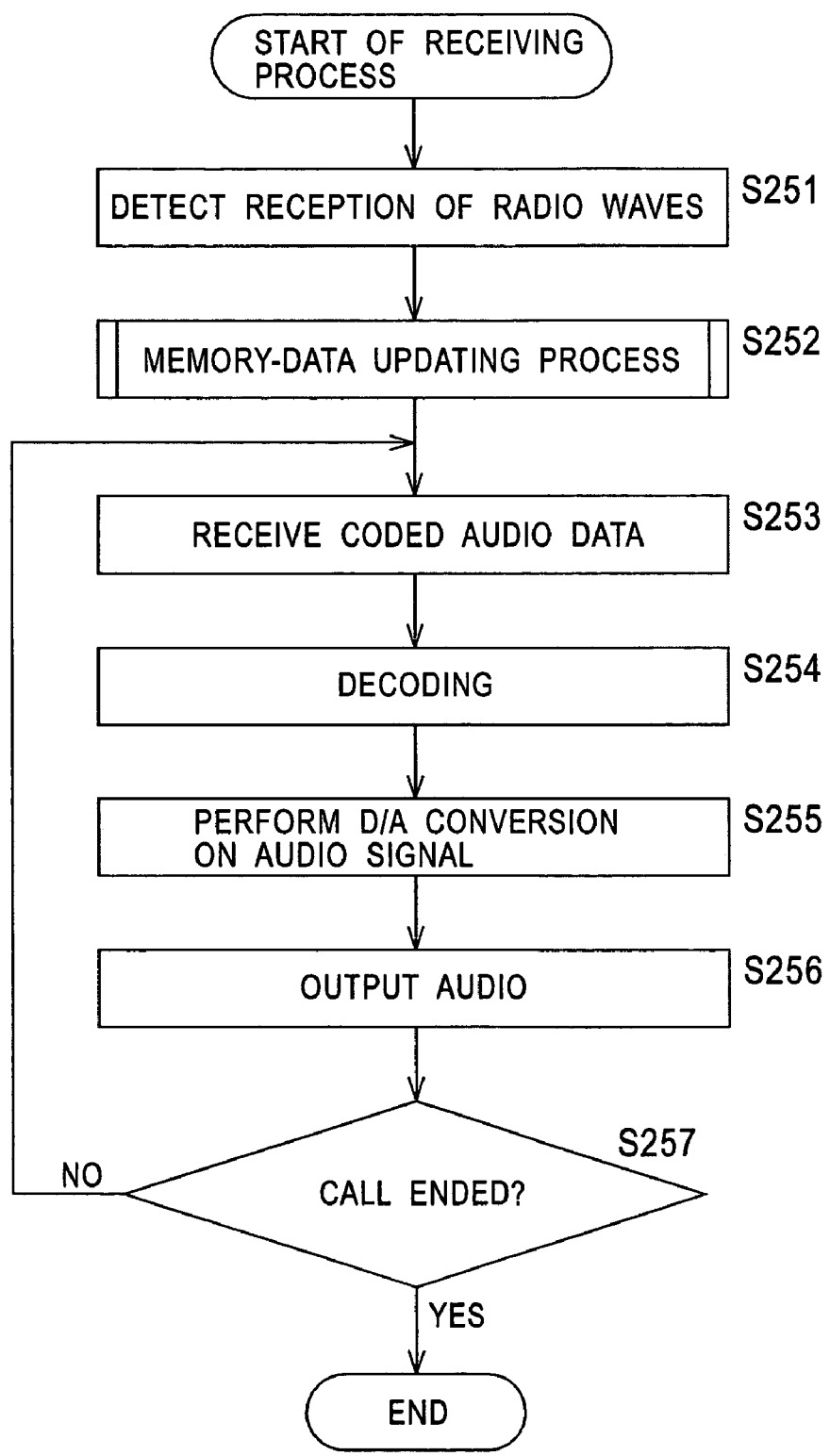
FIG. 33 is a flowchart illustrating a receiving process in the receiving unit in FIG. 25.

Next, the memory-data updating process in step S252 in FIG. 33 is described with reference to the flowchart in FIG. 34.

In step S271, the reception control unit 331 determines whether an off-hook state has been set by operating the operation unit 315. When it is determined that the off-hook state has not been set, the process returns to step S271.

Also, when it is determined in step S271 that the off-hook state has been set, the process proceeds to step S272, and the reception control unit 331 establishes a communication link and proceeds to step S273. In step S273, the reception control unit 331 receives received data including the last memory data transmitted from the cellular phone $301_1$ at the transmitting end and supplies the received data to the management unit 335.

Figure 31:
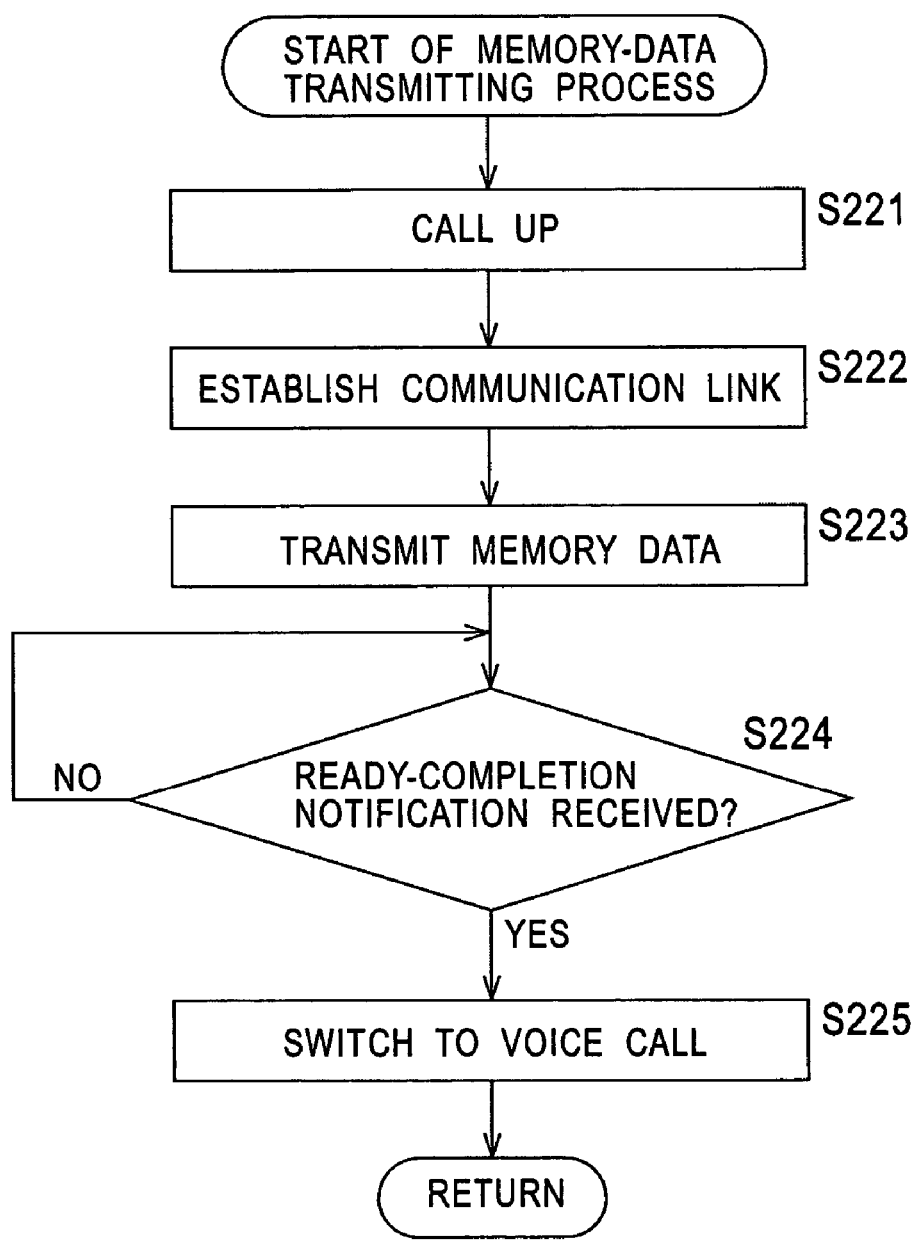
FIG. 31 is a flowchart illustrating a memory-data transmitting process in the step S202 in FIG. 30.

In other words, in the memory-data transmitting process in FIG. 31, as described above, in step S223, the cellular phone $301_1$ transmits the last memory data, with updating information. Thus, in step S273, the memory data and the updating information are received.

After that, proceeding to step S274, the management unit 335 refers to the updating information received from the cellular phone $301_1$ at the transmitting end and determines whether the last memory data about the user of the cellular phone $301_1$ is stored in the decoding unit 332.

When it is determined in step S274 that the last memory data about the user of the cellular phone $301_1$ is already stored in the decoding unit 332, the process proceeds to step S275, and the management unit 335 abandons the memory data and updating information received in step S273 before proceeding to step S277.

Also, when it is determined in step S274 that the last memory data about the user of the cellular phone $301_1$ has not been stored yet in the decoding unit 332, the process proceeds to step S276. The management unit 335 updates the content of the table memory 391 in the decoding unit 332 by storing, in the decoding unit 332, the last memory data obtained in step S273, in a form correlated with the telephone number of the cellular phone $301_1$ at the transmitting end, which is received in the call receiving mode, and the updating information transmitted with the memory data.

Proceeding to step S277, the management unit 335 controls the transmission control unit 324 in the transmitting unit 313 to transmit, as transmitting data, a ready-completion notification representing completion of a voice call, and proceeds to step S278.

In step S278, the reception control unit 331 comes into a vocal-call enabling state in which coded audio data included in the received data which is supplied thereto is output to the decoding unit 332, and the memory-data updating process ends.

Figure 35:
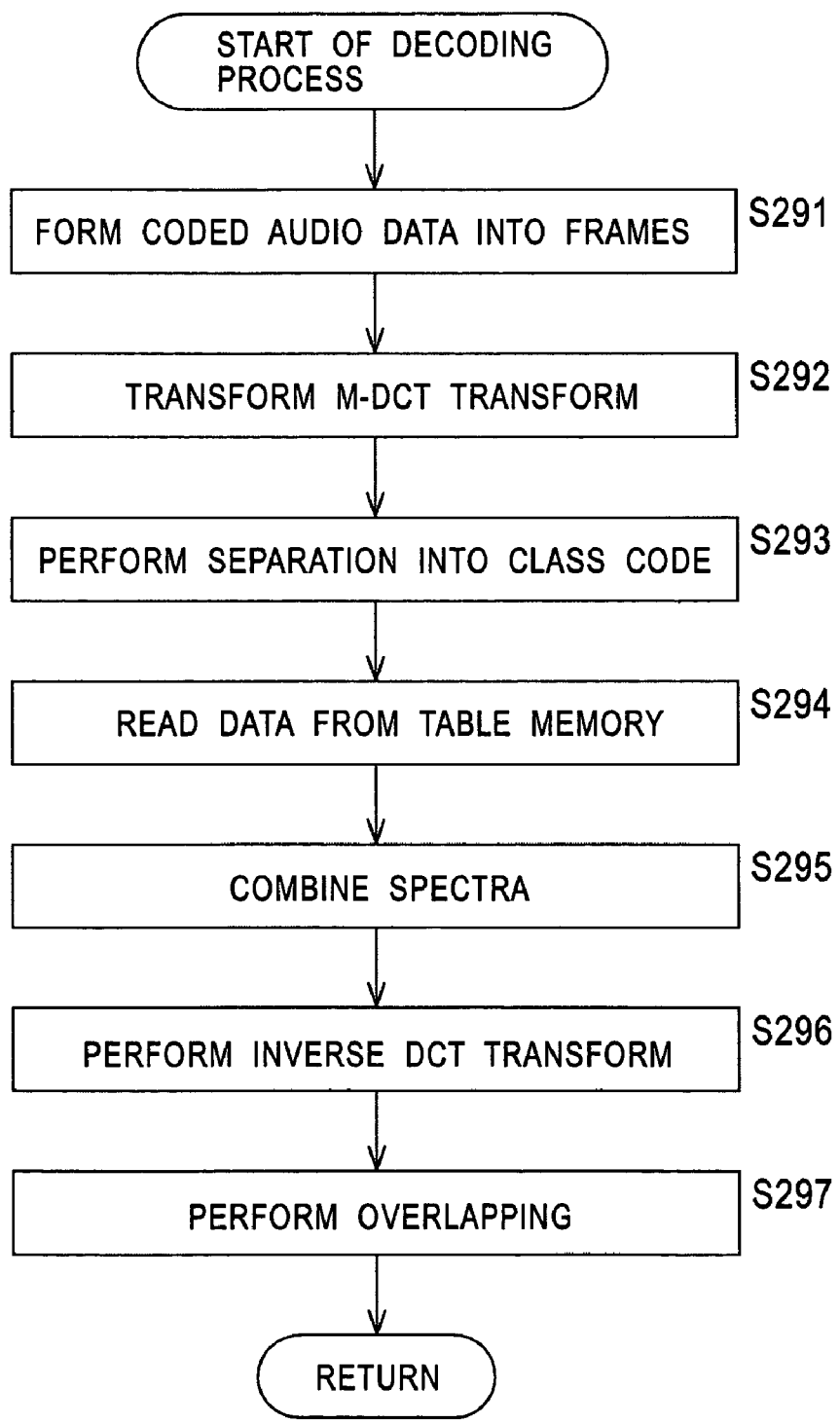
FIG. 35 is a flowchart illustrating a decoding process in the step S254 in FIG. 33.

Next, decoding in step S254 in FIG. 33 is described with reference to FIG. 35.

In step S291, the frame-unit dividing unit 371 divides the coded audio data input from the reception control unit 331 into frames.

In step S292, the DCT transform unit 372 performs an M-DCT transform on the coded audio data divided into frames in step S291 and outputs the transformed data as DCT spectrum data to the class-code-forming separating unit 373.

In step S293, the class-code-forming separating unit 373 separates the DCT spectrum data into a class code and a low frequency component, and outputs the class code to the table memory 391 and outputs the low frequency component to the spectrum combining unit 376.

In step S294, the table memory 391 outputs, to the gain adjusting unit 375, high-frequency-component DCT spectrum data at an address corresponding to the class code output by the class-code-forming separating unit 373.

In step S295, the spectrum combining unit 376 combines, in spectrum, the high frequency component input after being adjusted in gain by the gain adjusting unit 375 and the low frequency component input from the class-code-forming separating unit 373, and outputs the combined component to the inverse DCT transform unit 377.

In step S296, the inverse DCT transform unit 377 performs an inverse DCT transform on the combined DCT spectrum data.

Finally, in step S297, the frame combining unit 378 performs overlapping and outputs the result as a broad-range digital audio signal to the D/A converting unit 333 (FIG. 25).

Figure 34:
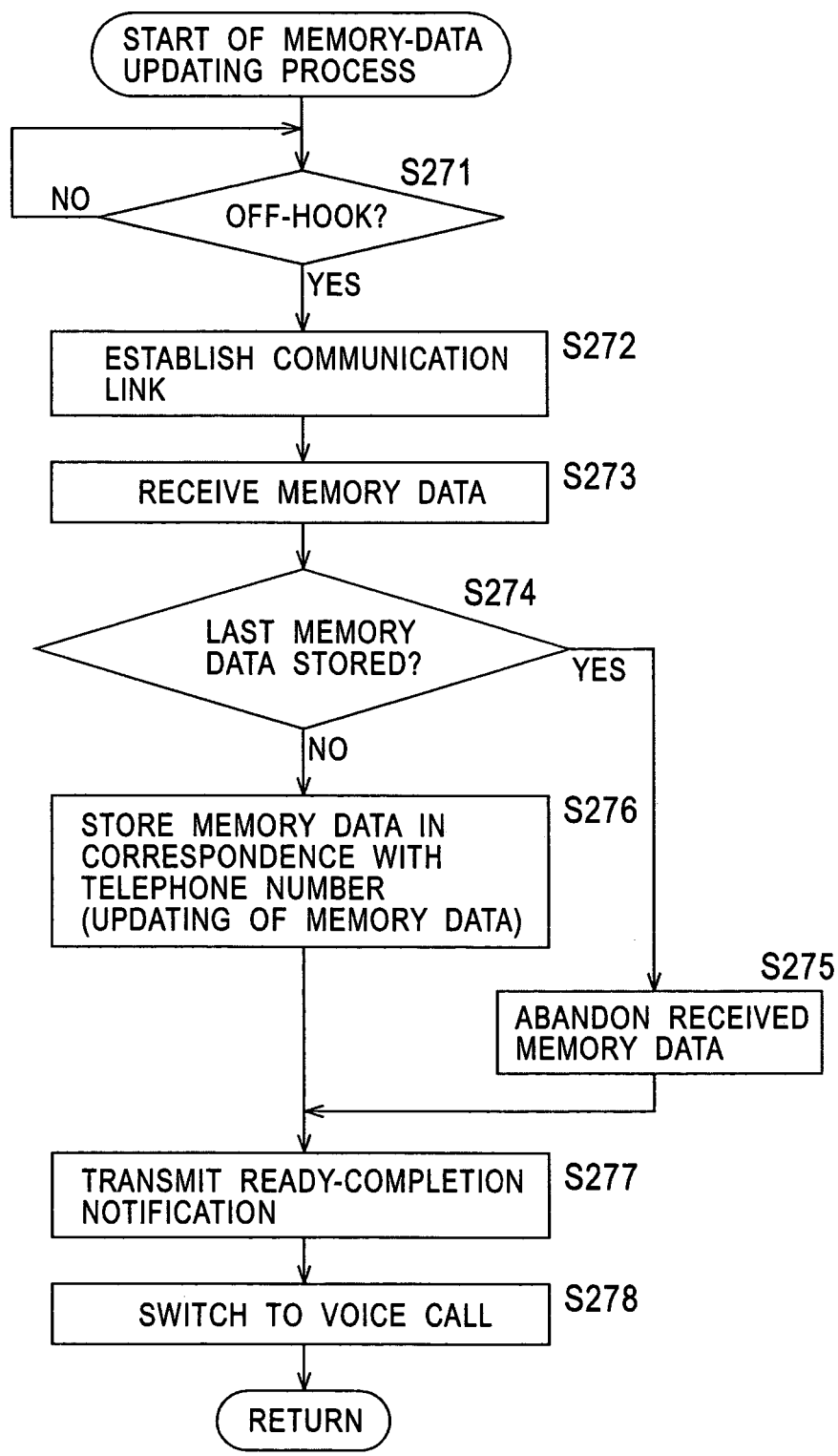
FIG. 34 is a flowchart illustrating a memory-data updating process in the step S252 in FIG. 33.

According to the memory-data updating process in FIG. 34, the stored content must be updated unless the last memory data about the user of the cellular phone $301_1$ at the transmitting end is stored in the cellular phone $301_2$ at the call receiving end.

However, the updating process is not limited thereto. The updating process may be performed only when the user requests updating of the memory data if needed and the request is enabled.

Also, in the embodiment, in a call receiving mode, a telephone number transmitted from a transmitting end is used as identification information for identifying a transmitting end by a call receiving end. However, it is possible that unique ID (Identifications) be assigned to users, etc., and the IDs be used as identification information.

A case in which learning-produced-data tables are stored corresponding to the telephone numbers of transmitters and are updated with predetermined timing has been described. An operation in a case in which the learning-produced-data table 374 (table memory) is fixed in FIG. 26 and FIG. 27 is similar to a case in which the memory-data transmitting process (the process shown in FIG. 31) in step S202 in FIG. 30 and the memory-data updating process (the process shown in FIG. 34) in step S252 in FIG. 33 are omitted.

The above consecutive processing may be performed by hardware or may be performed by software. When the consecutive processing is performed by software, programs constituting the software are installed in a multi-purpose computer or the like.

Figure 36:
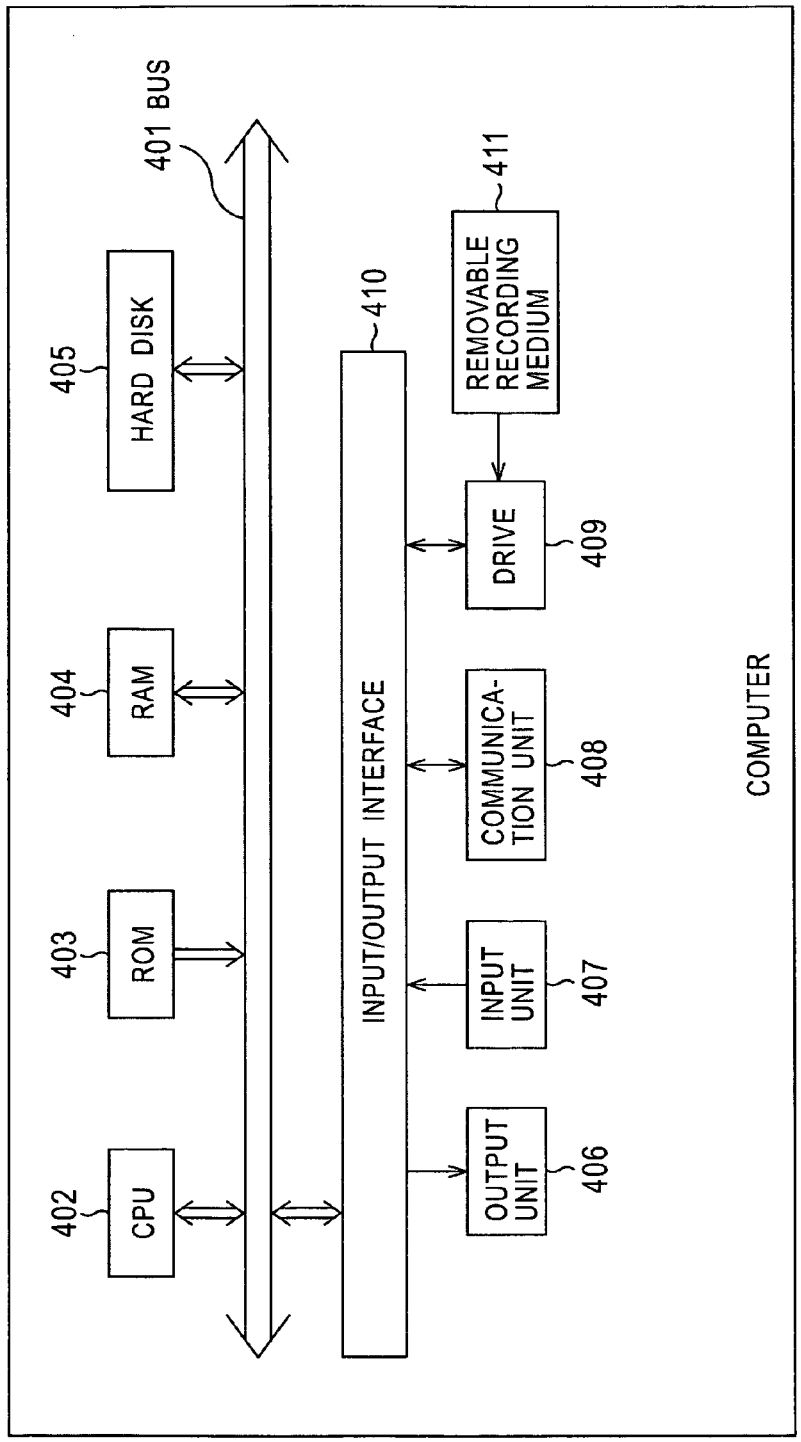
FIG. 36 is a block diagram showing an example of an embodiment of a computer to which the present invention is applied.

Accordingly, FIG. 36 shows an example of an embodiment of a computer into which programs for executing the above consecutive processing are installed.

The programs can be pre-recorded in a hard disk 405 or a ROM 403 as a recording medium built into the computer.

Alternatively, the programs can be temporarily or eternally stored (recorded) on a removable recording medium 411 such as a flexible disk, a CD-ROM (Compact Disc Read Only Memory), an MO (Magneto optical) disk, a DVD (Digital Versatile Disc), a magnetic disk, or a semiconductor memory. Such a removable recording medium 411 can be provided as so-called package software.

Not only the programs can be installed from the above recording medium 411 into the computer, but also the programs can be installed into the built-in hard disk 405 after being transferred by radio from a download site to the computer via a digital-satellite-broadcasting satellite or transferred to the computer via a network such as a LAN (Local Area Network) or the Internet, and being received by a communication unit 408.

The computer has a built-in CPU (Central Processing Unit) 402. An input/output interface 410 is connected to the CPU 402 by a bus 401. When an instruction is input such that the user performs an operation, or the like, on an input unit 407 including a keyboard, a mouse, and a microphone, the CPU 402 executes a program stored in a ROM (Read Only Memory) 403 in accordance with the instruction. Alternatively, the CPU 402 executes, in a form loaded into a RAM (Random Access Memory) 404, a program stored on the hard disk 405, a program installed into the hard disk 405 after being transferred from a satellite or a network and being received by the communication unit 408, or a program installed into the hard disk 405 after being read from the removable recording medium 411 in a state loaded into a drive 409. This causes the CPU 402 to perform the processes in accordance with the above flowcharts or processes based on the structures in the above block diagrams. The CPU 402 outputs the processing result, for example, from an output unit 406 constituted by an LCD (Liquid Crystal Display), a speaker, etc., through the input/output interface 410, transmits the result from the communication unit 408, or records the result on the hard disk 405.

In this specification, processing steps constituting programs for allowing a computer to perform various types of processing do not always need to be performed in a time-series manner in order in a flowchart form, and include processes (e.g., parallel processes or object-based processes) which are executed in parallel or separately.

In addition, the program may be processed by a single computer or may be processed in a distributed manner by a plurality of computers. The program may be executed after being transferred to a remote computer.

In the embodiment, a case in which the present invention is applied to an audio (image signal) broadening apparatus and a transmission system for performing a voice call between cellular phones has been described. In addition, the present invention can be widely applied to voice communication systems for tone improvement in fixed telephone voice, AM (Amplitude modulation)/FM (Frequency Modulation) radio-broadcast voice, analog TV (Television) broadcast received voice, etc.

In the specification, the term, system, means an entire apparatus constituted by a plurality of devices and means, etc.

INDUSTRIAL APPLICABILITY

As described above, according to a signal processing system and signal processing method for the signal processing system, of the present invention, a system in which high frequency components of a narrow-range signal having suppressed high frequency components can be restored with high accuracy is realized.

As described above, according to a first signal processing apparatus, signal processing method, recording medium, and program of the present invention, high frequency components of a narrow-range signal having suppressed high frequency components can be restored with high accuracy for another signal processing apparatus.

As described above, according to a second signal processing apparatus, signal processing method, recording medium, and program of the present invention, high frequency components of a narrow-range signal having suppressed high frequency components can be restored with high accuracy for another signal processing apparatus.

The invention claimed is:

1. A signal processing apparatus comprising:
first-signal input means for inputting a first signal having a broad range of frequency components;
second-signal input means for inputting a second signal in the first signal, the second signal having a narrow range having suppressed high frequency components;
extracting means for extracting high frequency components from the first signal input by said first-signal input means;
determining means for determining each class code based on the second signal input by said second-signal input means; and
storage means for storing, for the class code determined by said determining means, the high frequency components extracted by said extracting means.

2. A signal processing apparatus according to claim 1, wherein the first signal and the second signal are audio signals.

3. A signal processing apparatus according to claim 2, wherein, based on the second signal, which is processed by weighting based on equal loudness characteristics, said determining means determines the class code.

4. A signal processing apparatus according to claim 2, wherein, based on the positions of the average power level and maximum power level of an audio signal spectrum, said determining means determines the class code.

5. A signal processing apparatus according to claim 2, wherein said determining means determines the class code for a spectral component equal to or greater than a frequency which is ½ times or ⅓ times the lowest frequency of the high frequency components extracted by said extracting means.

6. A signal processing apparatus according to claim 1, wherein the first signal and the second signal are image signals.

7. A signal processing apparatus according to claim 6, wherein, based on the alternating-current average-power level, direct-current power level, and alternating-current-component peak-power level of the spectrum of each image signal, said determining means determines the class code.

8. A signal processing apparatus according to claim 1, wherein, in said storage means, the high frequency components extracted by said extracting means are stored so as to be correlated to specific information.

9. A signal processing apparatus according to claim 8, wherein the specific information is the telephone number of a telephone set.

10. A signal processing apparatus according to claim 1, further comprising generating means for generating the second signal by decimating the first signal at predetermined time intervals.

11. A signal processing apparatus comprising:
signal input means for inputting a signal having a narrow range having suppressed high frequency components;
determining means for determining a class code based on the signal input by said signal input means;
storage means for storing high frequency components;
combining means for combining the high frequency components stored in said storage means, which correspond to the class code determined by said determining means, and the signal input by said signal input means; and
output means for outputting the combined signal generated by said combining means.

12. A signal processing apparatus according to claim 11, wherein the signal input by said signal input means is an audio signal.

13. A signal processing apparatus according to claim 12, wherein, based on the signal, which is processed by weighting based on equal loudness characteristics, said determining means determines the class code.

14. A signal processing apparatus according to claim 12, wherein, based on the positions of the average power level and maximum power level of an audio signal spectrum, said determining means determines the class code.

15. A signal processing apparatus according to claim 12, wherein said determining means determines the class code for a spectral component equal to or greater than a frequency which is ½ times or ⅓ times the lowest frequency of the high frequency components stored in said storage means.

16. A signal processing apparatus according to claim 11, wherein the signal input by said signal input means is an image signal.

17. A signal processing apparatus according to claim 16, wherein, based on the alternating-current average-power level, direct-current power level, and alternating-current-component peak-power level of the spectrum of the image signal, said determining means determines the class code.

18. A signal processing apparatus according to claim 11, wherein the high frequency components stored in said storage means are updated with predetermined timing.

19. A signal processing apparatus according to claim 11, wherein, in said storage means, the high frequency components are stored so as to be correlated to specific information.

20. A signal processing apparatus according to claim 19, wherein the specific information is the telephone number of a telephone set.

* * * * *